US009640194B1

(12) United States Patent
Nemala et al.

(10) Patent No.: US 9,640,194 B1
(45) Date of Patent: May 2, 2017

(54) NOISE SUPPRESSION FOR SPEECH PROCESSING BASED ON MACHINE-LEARNING MASK ESTIMATION

(71) Applicant: Knowles Electronics, LLC, Itasca, IL (US)

(72) Inventors: Sridhar Krishna Nemala, Mountain View, CA (US); Jean Laroche, Santa Cruz, CA (US)

(73) Assignee: Knowles Electronics, LLC, Itasca, IL (US)

( * ) Notice: Subject to any disclaimer, the term of this patent is extended or adjusted under 35 U.S.C. 154(b) by 319 days.

(21) Appl. No.: 14/046,551

(22) Filed: Oct. 4, 2013

Related U.S. Application Data

(60) Provisional application No. 61/709,908, filed on Oct. 4, 2012.

(51) Int. Cl.
*G10L 15/00* (2013.01)
*G10L 21/0208* (2013.01)
*G10L 15/20* (2006.01)

(52) U.S. Cl.
CPC ................................ *G10L 21/0208* (2013.01)

(58) Field of Classification Search
CPC ..... G10L 15/22; G10L 21/0208; G10L 15/00; G10L 15/20; G10L 25/84;
(Continued)

(56) References Cited

U.S. PATENT DOCUMENTS 3,976,863 A 8/1976 Engel
3,978,287 A 8/1976 Fletcher et al.
(Continued)

FOREIGN PATENT DOCUMENTS

EP 0756437 A2 1/1997
EP 1232496 A1 8/2002
(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.
(Continued)

*Primary Examiner* — Thierry L Pham
(74) *Attorney, Agent, or Firm* — Foley & Lardner LLP

(57) ABSTRACT

Described are noise suppression techniques applicable to various systems including automatic speech processing systems in digital audio pre-processing. The noise suppression techniques utilize a machine-learning framework trained on cues pertaining to reference clean and noisy speech signals, and a corresponding synthetic noisy speech signal combining the clean and noisy speech signals. The machine-learning technique is further used to process audio signals in real time by extracting and analyzing cues pertaining to noisy speech to dynamically generate an appropriate gain mask, which may eliminate the noise components from the input audio signal. The audio signal pre-processed in such a manner may be applied to an automatic speech processing engine for corresponding interpretation or processing. The machine-learning technique may enable extraction of cues associated with clean automatic speech processing features, which may be used by the automatic speech processing engine for various automatic speech processing.

18 Claims, 9 Drawing Sheets

(58) Field of Classification Search
CPC ........... G10L 2021/02087; G10L 21/02; G10L 21/0216; G10L 2021/02161
USPC ................................ 704/226, 231, 233, 246
See application file for complete search history.

(56) References Cited

U.S. PATENT DOCUMENTS

| | | | |
|---|---|---|---|
| 4,137,510 | A | 1/1979 | Iwahara |
| 4,433,604 | A | 2/1984 | Ott |
| 4,516,259 | A | 5/1985 | Yato et al. |
| 4,535,473 | A | 8/1985 | Sakata |
| 4,536,844 | A | 8/1985 | Lyon |
| 4,581,758 | A | 4/1986 | Coker et al. |
| 4,628,529 | A | 12/1986 | Borth et al. |
| 4,630,304 | A | 12/1986 | Borth et al. |
| 4,649,505 | A | 3/1987 | Zinser, Jr. et al. |
| 4,658,426 | A | 4/1987 | Chabries et al. |
| 4,674,125 | A | 6/1987 | Carlson et al. |
| 4,718,104 | A | 1/1988 | Anderson |
| 4,811,404 | A | 3/1989 | Vilmur et al. |
| 4,812,996 | A | 3/1989 | Stubbs |
| 4,864,620 | A | 9/1989 | Bialick |
| 4,920,508 | A | 4/1990 | Yassaie et al. |
| 4,991,166 | A | 2/1991 | Julstrom |
| 5,027,410 | A | 6/1991 | Williamson et al. |
| 5,054,085 | A | 10/1991 | Meisel et al. |
| 5,058,419 | A | 10/1991 | Nordstrom et al. |
| 5,099,738 | A | 3/1992 | Hotz |
| 5,115,404 | A | 5/1992 | Lo et al. |
| 5,119,711 | A | 6/1992 | Bell et al. |
| 5,142,961 | A | 9/1992 | Paroutaud |
| 5,150,413 | A | 9/1992 | Nakatani et al. |
| 5,175,769 | A | 12/1992 | Hejna, Jr. et al. |
| 5,177,482 | A | 1/1993 | Cideciyan et al. |
| 5,187,776 | A | 2/1993 | Yanker |
| 5,208,864 | A | 5/1993 | Kaneda |
| 5,210,366 | A | 5/1993 | Sykes, Jr. |
| 5,216,423 | A | 6/1993 | Mukherjee |
| 5,222,251 | A | 6/1993 | Roney, IV et al. |
| 5,224,170 | A | 6/1993 | Waite, Jr. |
| 5,230,022 | A | 7/1993 | Sakata |
| 5,319,736 | A | 6/1994 | Hunt |
| 5,323,459 | A | 6/1994 | Hirano |
| 5,341,432 | A | 8/1994 | Suzuki et al. |
| 5,381,473 | A | 1/1995 | Andrea et al. |
| 5,381,512 | A | 1/1995 | Holton et al. |
| 5,400,409 | A | 3/1995 | Linhard |
| 5,402,493 | A | 3/1995 | Goldstein |
| 5,402,496 | A | 3/1995 | Soli et al. |
| 5,406,635 | A | 4/1995 | Jarvinen |
| 5,416,847 | A | 5/1995 | Boze |
| 5,471,195 | A | 11/1995 | Rickman |
| 5,473,759 | A | 12/1995 | Slaney et al. |
| 5,479,564 | A | 12/1995 | Vogten et al. |
| 5,502,663 | A | 3/1996 | Lyon |
| 5,544,250 | A | 8/1996 | Urbanski |
| 5,546,458 | A | 8/1996 | Iwami |
| 5,550,924 | A | 8/1996 | Helf et al. |
| 5,574,824 | A | 11/1996 | Slyh et al. |
| 5,590,241 | A | 12/1996 | Park et al. |
| 5,602,962 | A | 2/1997 | Kellermann |
| 5,625,697 | A | 4/1997 | Bowen et al. |
| 5,633,631 | A | 5/1997 | Teckman |
| 5,675,778 | A | 10/1997 | Jones |
| 5,694,474 | A | 12/1997 | Ngo et al. |
| 5,706,395 | A | 1/1998 | Arslan et al. |
| 5,717,829 | A | 2/1998 | Takagi |
| 5,729,612 | A | 3/1998 | Abel et al. |
| 5,732,189 | A | 3/1998 | Johnston et al. |
| 5,749,064 | A | 5/1998 | Pawate et al. |
| 5,754,665 | A | 5/1998 | Hosoi |
| 5,757,937 | A | 5/1998 | Itoh et al. |
| 5,774,837 | A | 6/1998 | Yeldener et al. |
| 5,777,658 | A | 7/1998 | Kerr et al. |
| 5,792,971 | A | 8/1998 | Timis et al. |
| 5,796,819 | A | 8/1998 | Romesburg |
| 5,806,025 | A | 9/1998 | Vis et al. |
| 5,809,463 | A | 9/1998 | Gupta et al. |
| 5,819,215 | A | 10/1998 | Dobson et al. |
| 5,839,101 | A | 11/1998 | Vahatalo et al. |
| 5,845,243 | A | 12/1998 | Smart et al. |
| 5,887,032 | A | 3/1999 | Cioffi |
| 5,917,921 | A | 6/1999 | Sasaki et al. |
| 5,920,840 | A | 7/1999 | Satyamurti et al. |
| 5,933,495 | A | 8/1999 | Oh |
| 5,943,429 | A | 8/1999 | Handel |
| 5,978,824 | A | 11/1999 | Ikeda |
| 5,983,139 | A | 11/1999 | Zierhofer |
| 5,990,405 | A | 11/1999 | Auten et al. |
| 6,002,776 | A | 12/1999 | Bhadkamkar et al. |
| 6,011,853 | A | 1/2000 | Koski et al. |
| 6,061,456 | A | 5/2000 | Andrea et al. |
| 6,072,881 | A | 6/2000 | Linder |
| 6,084,916 | A | 7/2000 | Ott |
| 6,092,126 | A | 7/2000 | Rossum |
| 6,097,820 | A | 8/2000 | Turner |
| 6,098,038 | A | 8/2000 | Hermansky et al. |
| 6,108,626 | A | 8/2000 | Cellario et al. |
| 6,122,384 | A | 9/2000 | Mauro |
| 6,122,610 | A | 9/2000 | Isabelle |
| 6,125,175 | A | 9/2000 | Goldberg et al. |
| 6,134,524 | A | 10/2000 | Peters et al. |
| 6,137,349 | A | 10/2000 | Menkhoff et al. |
| 6,140,809 | A | 10/2000 | Doi |
| 6,144,937 | A | 11/2000 | Ali |
| 6,173,255 | B1 | 1/2001 | Wilson et al. |
| 6,188,797 | B1 | 2/2001 | Moledina et al. |
| 6,205,421 | B1 | 3/2001 | Morii |
| 6,205,422 | B1 | 3/2001 | Gu et al. |
| 6,208,671 | B1 | 3/2001 | Paulos et al. |
| 6,216,103 | B1 | 4/2001 | Wu et al. |
| 6,222,927 | B1 | 4/2001 | Feng et al. |
| 6,223,090 | B1 | 4/2001 | Brungart |
| 6,263,307 | B1 | 7/2001 | Arslan et al. |
| 6,266,633 | B1 | 7/2001 | Higgins et al. |
| 6,317,501 | B1 | 11/2001 | Matsuo |
| 6,321,193 | B1 | 11/2001 | Nystrom et al. |
| 6,324,235 | B1 | 11/2001 | Savell et al. |
| 6,327,370 | B1 | 12/2001 | Killion et al. |
| 6,339,706 | B1 | 1/2002 | Tillgren et al. |
| 6,339,758 | B1 | 1/2002 | Kanazawa et al. |
| 6,343,267 | B1 | 1/2002 | Kuhn et al. |
| 6,355,869 | B1 | 3/2002 | Mitton |
| 6,363,345 | B1 | 3/2002 | Marash et al. |
| 6,381,469 | B1 | 4/2002 | Wojick |
| 6,381,570 | B2 | 4/2002 | Li et al. |
| 6,389,142 | B1 | 5/2002 | Hagen et al. |
| 6,411,930 | B1 | 6/2002 | Burges |
| 6,424,938 | B1 | 7/2002 | Johansson et al. |
| 6,430,295 | B1 | 8/2002 | Handel et al. |
| 6,434,417 | B1 | 8/2002 | Lovett |
| 6,449,586 | B1 | 9/2002 | Hoshuyama |
| 6,453,284 | B1 | 9/2002 | Paschall |
| 6,453,289 | B1 | 9/2002 | Ertem et al. |
| 6,456,209 | B1 | 9/2002 | Savari |
| 6,469,732 | B1 | 10/2002 | Chang et al. |
| 6,477,489 | B1 | 11/2002 | Lockwood et al. |
| 6,480,610 | B1 | 11/2002 | Fang et al. |
| 6,487,257 | B1 | 11/2002 | Gustafsson et al. |
| 6,496,795 | B1 | 12/2002 | Malvar |
| 6,513,004 | B1 | 1/2003 | Rigazio et al. |
| 6,516,066 | B2 | 2/2003 | Hayashi |
| 6,516,136 | B1 | 2/2003 | Lee |
| 6,526,140 | B1 | 2/2003 | Marchok et al. |
| 6,529,606 | B1 | 3/2003 | Jackson, Jr. II et al. |
| 6,531,970 | B2 | 3/2003 | McLaughlin et al. |
| 6,549,630 | B1 | 4/2003 | Bobisuthi |
| 6,584,203 | B2 | 6/2003 | Elko et al. |
| 6,615,170 | B1 | 9/2003 | Liu et al. |
| 6,647,067 | B1 | 11/2003 | Hjelm et al. |
| 6,683,938 | B1 | 1/2004 | Henderson |
| 6,717,991 | B1 | 4/2004 | Gustafsson et al. |
| 6,718,309 | B1 | 4/2004 | Selly |
| 6,738,482 | B1 | 5/2004 | Jaber |

(56) References Cited

U.S. PATENT DOCUMENTS

| | | | |
|---|---|---|---|
| 6,745,155 | B1 | 6/2004 | Andringa et al. |
| 6,760,450 | B2 | 7/2004 | Matsuo |
| 6,768,979 | B1 | 7/2004 | Menendez-Pidal et al. |
| 6,778,954 | B1 | 8/2004 | Kim et al. |
| 6,782,363 | B2 | 8/2004 | Lee et al. |
| 6,785,381 | B2 | 8/2004 | Gartner et al. |
| 6,792,118 | B2 | 9/2004 | Watts |
| 6,795,558 | B2 | 9/2004 | Matsuo |
| 6,798,886 | B1 | 9/2004 | Smith et al. |
| 6,804,203 | B1 | 10/2004 | Benyassine et al. |
| 6,804,651 | B2 | 10/2004 | Juric et al. |
| 6,810,273 | B1 | 10/2004 | Mattila et al. |
| 6,859,508 | B1 | 2/2005 | Koyama et al. |
| 6,882,736 | B2 | 4/2005 | Dickel et al. |
| 6,915,257 | B2 | 7/2005 | Heikkinen et al. |
| 6,915,264 | B2 | 7/2005 | Baumgarte |
| 6,917,688 | B2 | 7/2005 | Yu et al. |
| 6,934,387 | B1 | 8/2005 | Kim |
| 6,978,159 | B2 | 12/2005 | Feng et al. |
| 6,982,377 | B2 | 1/2006 | Sakurai et al. |
| 6,990,196 | B2 | 1/2006 | Zeng et al. |
| 7,010,134 | B2 | 3/2006 | Jensen |
| 7,016,507 | B1 | 3/2006 | Brennan |
| 7,020,605 | B2 | 3/2006 | Gao |
| RE39,080 | E | 4/2006 | Johnston |
| 7,031,478 | B2 | 4/2006 | Belt et al. |
| 7,035,666 | B2 | 4/2006 | Silberfenig et al. |
| 7,042,934 | B2 | 5/2006 | Zamir |
| 7,050,388 | B2 | 5/2006 | Kim et al. |
| 7,054,452 | B2 | 5/2006 | Ukita |
| 7,054,808 | B2 | 5/2006 | Yoshida |
| 7,058,572 | B1 | 6/2006 | Nemer |
| 7,065,485 | B1 | 6/2006 | Chong-White et al. |
| 7,065,486 | B1 | 6/2006 | Thyssen |
| 7,072,834 | B2 | 7/2006 | Zhou |
| 7,076,315 | B1 | 7/2006 | Watts |
| 7,092,529 | B2 | 8/2006 | Yu et al. |
| 7,092,882 | B2 | 8/2006 | Arrowood et al. |
| 7,099,821 | B2 | 8/2006 | Visser et al. |
| 7,110,554 | B2 | 9/2006 | Brennan et al. |
| 7,127,072 | B2 | 10/2006 | Rademacher et al. |
| 7,142,677 | B2 | 11/2006 | Gonopolskiy et al. |
| 7,146,013 | B1 | 12/2006 | Saito et al. |
| 7,146,316 | B2 | 12/2006 | Alves |
| 7,155,019 | B2 | 12/2006 | Hou |
| 7,165,026 | B2 | 1/2007 | Acero et al. |
| 7,171,008 | B2 | 1/2007 | Elko |
| 7,171,246 | B2 | 1/2007 | Mattila et al. |
| 7,174,022 | B1 | 2/2007 | Zhang et al. |
| 7,190,665 | B2 | 3/2007 | Warke et al. |
| 7,190,775 | B2 | 3/2007 | Rambo |
| 7,206,418 | B2 | 4/2007 | Yang et al. |
| 7,209,567 | B1 | 4/2007 | Kozel et al. |
| 7,221,622 | B2 | 5/2007 | Matsuo et al. |
| 7,225,001 | B1 | 5/2007 | Eriksson et al. |
| 7,242,762 | B2 | 7/2007 | He et al. |
| 7,245,767 | B2 | 7/2007 | Moreno et al. |
| 7,246,058 | B2 | 7/2007 | Burnett |
| 7,254,242 | B2 | 8/2007 | Ise et al. |
| 7,254,535 | B2 | 8/2007 | Kushner et al. |
| 7,289,554 | B2 | 10/2007 | Alloin |
| 7,289,955 | B2 | 10/2007 | Deng et al. |
| 7,327,985 | B2 | 2/2008 | Morfitt, III et al. |
| 7,330,138 | B2 | 2/2008 | Mallinson et al. |
| 7,339,503 | B1 | 3/2008 | Elenes |
| 7,359,520 | B2 | 4/2008 | Brennan et al. |
| 7,376,558 | B2 | 5/2008 | Gemello et al. |
| 7,383,179 | B2 | 6/2008 | Alves et al. |
| 7,395,298 | B2 | 7/2008 | Debes et al. |
| 7,412,379 | B2 | 8/2008 | Taori et al. |
| 7,433,907 | B2 | 10/2008 | Nagai et al. |
| 7,436,333 | B2 | 10/2008 | Forman et al. |
| 7,469,208 | B1 | 12/2008 | Kincaid |
| 7,516,067 | B2 | 4/2009 | Seltzer et al. |
| 7,555,434 | B2 | 6/2009 | Nomura et al. |
| 7,561,627 | B2 | 7/2009 | Chow et al. |
| 7,562,140 | B2 | 7/2009 | Clemm et al. |
| 7,574,352 | B2 | 8/2009 | Quatieri, Jr. |
| 7,577,084 | B2 | 8/2009 | Tang et al. |
| 7,617,099 | B2 | 11/2009 | Yang et al. |
| 7,617,282 | B2 | 11/2009 | Han |
| 7,657,038 | B2 | 2/2010 | Doclo et al. |
| 7,664,640 | B2 | 2/2010 | Webber |
| 7,725,314 | B2 | 5/2010 | Wu et al. |
| 7,764,752 | B2 | 7/2010 | Langberg et al. |
| 7,777,658 | B2 | 8/2010 | Nguyen et al. |
| 7,783,032 | B2 | 8/2010 | Abutalebi et al. |
| 7,783,481 | B2 | 8/2010 | Endo et al. |
| 7,791,508 | B2 | 9/2010 | Wegener |
| 7,895,036 | B2 | 2/2011 | Hetherington et al. |
| 7,912,567 | B2 | 3/2011 | Chhatwal et al. |
| 7,925,502 | B2 | 4/2011 | Droppo et al. |
| 7,949,522 | B2 | 5/2011 | Hetherington et al. |
| 7,953,596 | B2 | 5/2011 | Pinto |
| 8,010,355 | B2 | 8/2011 | Rahbar |
| 8,032,364 | B1 | 10/2011 | Watts |
| 8,046,219 | B2 | 10/2011 | Zurek et al. |
| 8,081,878 | B1 | 12/2011 | Zhang et al. |
| 8,098,812 | B2 | 1/2012 | Fadili et al. |
| 8,103,011 | B2 | 1/2012 | Mohammad et al. |
| 8,107,656 | B2 | 1/2012 | Dreβler et al. |
| 8,126,159 | B2 | 2/2012 | Goose et al. |
| 8,140,331 | B2 | 3/2012 | Lou |
| 8,143,620 | B1 | 3/2012 | Malinowski et al. |
| 8,150,065 | B2 | 4/2012 | Solbach et al. |
| 8,155,953 | B2 | 4/2012 | Park et al. |
| 8,175,291 | B2 | 5/2012 | Chan et al. |
| 8,180,064 | B1 | 5/2012 | Avendano et al. |
| 8,184,818 | B2 | 5/2012 | Ishiguro |
| 8,189,429 | B2 | 5/2012 | Chen et al. |
| 8,194,880 | B2 | 6/2012 | Avendano |
| 8,194,882 | B2 | 6/2012 | Every et al. |
| 8,204,252 | B1 | 6/2012 | Avendano |
| 8,204,253 | B1 | 6/2012 | Solbach |
| 8,223,988 | B2 | 7/2012 | Wang et al. |
| 8,280,731 | B2 | 10/2012 | Yu |
| 8,345,890 | B2 | 1/2013 | Avendano et al. |
| 8,359,195 | B2 | 1/2013 | Li |
| 8,363,850 | B2 | 1/2013 | Amada |
| 8,369,973 | B2 | 2/2013 | Risbo |
| 8,378,871 | B1 | 2/2013 | Bapat |
| 8,447,596 | B2 | 5/2013 | Avendano et al. |
| 8,467,891 | B2 | 6/2013 | Huang et al. |
| 8,473,285 | B2 | 6/2013 | Every et al. |
| 8,488,805 | B1 | 7/2013 | Santos et al. |
| 8,494,193 | B2 | 7/2013 | Zhang et al. |
| 8,521,530 | B1 | 8/2013 | Every et al. |
| 8,538,035 | B2 | 9/2013 | Every et al. |
| 8,606,249 | B1 | 12/2013 | Goodwin |
| 8,639,516 | B2 | 1/2014 | Lindahl et al. |
| 8,682,006 | B1 | 3/2014 | Laroche et al. |
| 8,705,759 | B2 | 4/2014 | Wolff et al. |
| 8,718,290 | B2 | 5/2014 | Murgia et al. |
| 8,737,188 | B1 | 5/2014 | Murgia et al. |
| 8,737,532 | B2 | 5/2014 | Green et al. |
| 8,744,844 | B2 | 6/2014 | Klein |
| 8,750,526 | B1 | 6/2014 | Santos et al. |
| 8,762,144 | B2 | 6/2014 | Cho et al. |
| 8,774,423 | B1 | 7/2014 | Solbach |
| 8,781,137 | B1 | 7/2014 | Goodwin |
| 8,804,865 | B2 | 8/2014 | Elenes et al. |
| 8,867,759 | B2 | 10/2014 | Avendano et al. |
| 8,880,396 | B1 | 11/2014 | Laroche et al. |
| 8,886,525 | B2 | 11/2014 | Klein |
| 8,949,120 | B1 | 2/2015 | Every et al. |
| 8,949,266 | B2 | 2/2015 | Phillips et al. |
| 8,965,942 | B1 | 2/2015 | Rossum et al. |
| 9,008,329 | B1 | 4/2015 | Mandel et al. |
| 9,049,282 | B1 | 6/2015 | Murgia et al. |
| 9,076,456 | B1 | 7/2015 | Avendano et al. |
| 9,143,857 | B2 | 9/2015 | Every et al. |
| 9,185,487 | B2 | 11/2015 | Solbach et al. |
| 9,197,974 | B1 | 11/2015 | Clark et al. |
| 9,236,874 | B1 | 1/2016 | Rossum |

(56) References Cited

U.S. PATENT DOCUMENTS 9,343,056 B1 5/2016 Goodwin
2001/0016020 A1 8/2001 Gustafsson et al.
2001/0031053 A1 10/2001 Feng et al.
2001/0044719 A1 11/2001 Casey
2001/0053228 A1 12/2001 Jones
2002/0002455 A1 1/2002 Accardi et al.
2002/0009203 A1 1/2002 Erten
2002/0041693 A1 4/2002 Matsuo
2002/0080980 A1 6/2002 Matsuo
2002/0106092 A1 8/2002 Matsuo
2002/0116187 A1 8/2002 Erten
2002/0133334 A1 9/2002 Coorman et al.
2002/0138263 A1 9/2002 Deligne et al.
2002/0147595 A1 10/2002 Baumgarte
2002/0156624 A1 10/2002 Gigi
2002/0160751 A1 10/2002 Sun et al.
2002/0176589 A1 11/2002 Buck et al.
2002/0177995 A1 11/2002 Walker
2002/0194159 A1 12/2002 Kamath et al.
2003/0014248 A1 1/2003 Vetter
2003/0026437 A1 2/2003 Janse et al.
2003/0033140 A1 2/2003 Taori et al.
2003/0038736 A1 2/2003 Becker et al.
2003/0039369 A1 2/2003 Bullen
2003/0040908 A1 2/2003 Yang et al.
2003/0056220 A1 3/2003 Thornton et al.
2003/0061032 A1 3/2003 Gonopolskiy
2003/0063759 A1 4/2003 Brennan et al.
2003/0072382 A1 4/2003 Raleigh et al.
2003/0072460 A1 4/2003 Gonopolskiy et al.
2003/0095667 A1 5/2003 Watts
2003/0099345 A1 5/2003 Gartner et al.
2003/0099370 A1 5/2003 Moore
2003/0101048 A1 5/2003 Liu
2003/0103632 A1 6/2003 Goubran et al.
2003/0118200 A1 6/2003 Beaucoup et al.
2003/0128851 A1 7/2003 Furuta
2003/0138116 A1 7/2003 Jones et al.
2003/0147538 A1 8/2003 Elko
2003/0169891 A1 9/2003 Ryan et al.
2003/0177006 A1 9/2003 Ichikawa et al.
2003/0191641 A1 10/2003 Acero et al.
2003/0228023 A1 12/2003 Burnett et al.
2004/0001450 A1 1/2004 He et al.
2004/0013276 A1 1/2004 Ellis et al.
2004/0015348 A1 1/2004 McArthur et al.
2004/0042616 A1 3/2004 Matsuo
2004/0047464 A1 3/2004 Yu et al.
2004/0078199 A1 4/2004 Kremer et al.
2004/0102967 A1 5/2004 Furuta et al.
2004/0125965 A1 7/2004 Alberth, Jr. et al.
2004/0131178 A1 7/2004 Shahaf et al.
2004/0133421 A1 7/2004 Burnett et al.
2004/0148166 A1 7/2004 Zheng
2004/0165736 A1 8/2004 Hetherington et al.
2004/0185804 A1 9/2004 Kanamori et al.
2004/0196989 A1 10/2004 Friedman et al.
2004/0263636 A1 12/2004 Cutler et al.
2005/0008179 A1 1/2005 Quinn
2005/0025263 A1 2/2005 Wu
2005/0027520 A1 2/2005 Mattila et al.
2005/0049857 A1 3/2005 Seltzer et al.
2005/0049864 A1 3/2005 Kaltenmeier et al.
2005/0060142 A1 3/2005 Visser et al.
2005/0066279 A1 3/2005 LeBarton et al.
2005/0069162 A1 3/2005 Haykin et al.
2005/0075866 A1 4/2005 Widrow
2005/0114123 A1 5/2005 Lukac et al.
2005/0114128 A1 5/2005 Hetherington et al.
2005/0152559 A1 7/2005 Gierl et al.
2005/0152563 A1 7/2005 Amada et al.
2005/0185813 A1 8/2005 Sinclair et al.
2005/0203735 A1 9/2005 Ichikawa
2005/0213778 A1 9/2005 Buck et al.
2005/0216259 A1 9/2005 Watts
2005/0228518 A1 10/2005 Watts
2005/0238238 A1 10/2005 Xu et al.
2005/0240399 A1 10/2005 Makinen
2005/0261894 A1 11/2005 Balan et al.
2005/0276423 A1 12/2005 Aubauer et al.
2005/0288923 A1 12/2005 Kok
2006/0053007 A1* 3/2006 Niemisto ................ G10L 25/78 704/233
2006/0058998 A1 3/2006 Yamamoto et al.
2006/0072768 A1 4/2006 Schwartz et al.
2006/0074646 A1 4/2006 Alves et al.
2006/0098809 A1 5/2006 Nongpiur et al.
2006/0120537 A1 6/2006 Burnett et al.
2006/0122832 A1 6/2006 Takiguchi et al.
2006/0133621 A1 6/2006 Chen et al.
2006/0136201 A1 6/2006 Landron et al.
2006/0149535 A1 7/2006 Choi et al.
2006/0153391 A1 7/2006 Hooley et al.
2006/0160581 A1 7/2006 Beaugeant et al.
2006/0165202 A1 7/2006 Thomas et al.
2006/0184363 A1 8/2006 McCree et al.
2006/0206320 A1 9/2006 Li
2006/0222184 A1 10/2006 Buck et al.
2006/0224382 A1 10/2006 Taneda
2007/0021958 A1 1/2007 Visser et al.
2007/0027685 A1 2/2007 Arakawa et al.
2007/0033020 A1 2/2007 (Kelleher) Francois et al.
2007/0033032 A1 2/2007 Schubert et al.
2007/0041589 A1 2/2007 Patel et al.
2007/0055508 A1 3/2007 Zhao et al.
2007/0071206 A1 3/2007 Gainsboro et al.
2007/0078649 A1 4/2007 Hetherington et al.
2007/0094031 A1 4/2007 Chen
2007/0110263 A1 5/2007 Brox
2007/0116300 A1 5/2007 Chen
2007/0127668 A1 6/2007 Ahya et al.
2007/0136059 A1 6/2007 Gadbois
2007/0150268 A1 6/2007 Acero et al.
2007/0154031 A1 7/2007 Avendano et al.
2007/0165879 A1 7/2007 Deng et al.
2007/0195968 A1 8/2007 Jaber
2007/0211064 A1* 9/2007 Buck .................... G06N 99/005 345/519
2007/0230712 A1 10/2007 Belt et al.
2007/0230913 A1 10/2007 Ichimura
2007/0237339 A1 10/2007 Konchitsky
2007/0276656 A1 11/2007 Solbach et al.
2007/0294263 A1 12/2007 Punj et al.
2008/0019548 A1 1/2008 Avendano
2008/0033723 A1 2/2008 Jang et al.
2008/0059163 A1 3/2008 Ding et al.
2008/0071540 A1 3/2008 Nakano et al.
2008/0140391 A1 6/2008 Yen et al.
2008/0152157 A1 6/2008 Lin et al.
2008/0159507 A1 7/2008 Virolainen et al.
2008/0160977 A1 7/2008 Ahmaniemi et al.
2008/0170703 A1 7/2008 Zivney
2008/0192955 A1 8/2008 Merks
2008/0201138 A1 8/2008 Visser et al.
2008/0228474 A1 9/2008 Huang et al.
2008/0228478 A1 9/2008 Hetherington et al.
2008/0233934 A1 9/2008 Diethorn
2008/0259731 A1 10/2008 Happonen
2008/0260175 A1 10/2008 Elko
2008/0273476 A1 11/2008 Cohen et al.
2008/0298571 A1 12/2008 Kurtz et al.
2008/0304677 A1 12/2008 Abolfathi et al.
2008/0317259 A1 12/2008 Zhang et al.
2008/0317261 A1 12/2008 Yoshida et al.
2009/0012783 A1 1/2009 Klein
2009/0012786 A1 1/2009 Zhang et al.
2009/0034755 A1 2/2009 Short et al.
2009/0063142 A1 3/2009 Sukkar
2009/0089054 A1 4/2009 Wang et al.
2009/0116652 A1 5/2009 Kirkeby et al.
2009/0129610 A1 5/2009 Kim et al.
2009/0141908 A1 6/2009 Jeong et al.
2009/0144053 A1 6/2009 Tamura et al.
2009/0147942 A1 6/2009 Culter

(56) References Cited

U.S. PATENT DOCUMENTS

2009/0150149 A1 6/2009 Culter et al.
2009/0154717 A1 6/2009 Hoshuyama
2009/0164905 A1 6/2009 Ko
2009/0177464 A1 7/2009 Gao et al.
2009/0220107 A1 9/2009 Every et al.
2009/0240497 A1 9/2009 Usher et al.
2009/0245335 A1 10/2009 Fang
2009/0245444 A1 10/2009 Fang
2009/0253418 A1 10/2009 Makinen
2009/0264114 A1 10/2009 Virolainen et al.
2009/0271187 A1 10/2009 Yen et al.
2009/0292536 A1 11/2009 Hetherington et al.
2009/0323925 A1 12/2009 Sweeney et al.
2009/0323981 A1 12/2009 Cutler
2009/0323982 A1 12/2009 Solbach et al.
2010/0017205 A1 1/2010 Visser et al.
2010/0027799 A1 2/2010 Romesburg et al.
2010/0036659 A1 2/2010 Haulick et al.
2010/0082339 A1 4/2010 Konchitsky et al.
2010/0092007 A1 4/2010 Sun
2010/0094622 A1 4/2010 Cardillo et al.
2010/0103776 A1 4/2010 Chan
2010/0105447 A1 4/2010 Sibbald et al.
2010/0128123 A1 5/2010 DiPoala
2010/0130198 A1 5/2010 Kannappan et al.
2010/0138220 A1 6/2010 Matsumoto et al.
2010/0166199 A1 7/2010 Seydoux
2010/0177916 A1 7/2010 Gerkmann et al.
2010/0215184 A1 8/2010 Buck et al.
2010/0278352 A1 11/2010 Petit et al.
2010/0282045 A1 11/2010 Chen et al.
2010/0290615 A1 11/2010 Takahashi
2010/0303298 A1 12/2010 Marks et al.
2010/0309774 A1 12/2010 Astrom
2010/0315482 A1 12/2010 Rosenfeld et al.
2011/0019833 A1 1/2011 Kuech et al.
2011/0026734 A1 2/2011 Hetherington et al.
2011/0035213 A1 2/2011 Malenovsky et al.
2011/0060587 A1 3/2011 Phillips et al.
2011/0081026 A1 4/2011 Ramakrishnan et al.
2011/0091047 A1 4/2011 Konchitsky et al.
2011/0101654 A1 5/2011 Cech
2011/0123019 A1 5/2011 Gowreesunker et al.
2011/0178800 A1 7/2011 Watts
2011/0182436 A1 7/2011 Murgia et al.
2011/0261150 A1 10/2011 Goyal et al.
2011/0286605 A1 11/2011 Furuta et al.
2011/0300806 A1 12/2011 Lindahl et al.
2011/0305345 A1 12/2011 Bouchard et al.
2012/0010881 A1 1/2012 Avendano et al.
2012/0027217 A1 2/2012 Jun et al.
2012/0027218 A1 2/2012 Every et al.
2012/0050582 A1 3/2012 Seshadri et al.
2012/0062729 A1 3/2012 Hart et al.
2012/0063609 A1 3/2012 Triki et al.
2012/0087514 A1 4/2012 Williams et al.
2012/0093341 A1 4/2012 Kim et al.
2012/0116758 A1* 5/2012 Murgia et al. ................ 704/226
2012/0121096 A1 5/2012 Chen et al.
2012/0133728 A1 5/2012 Lee
2012/0140917 A1 6/2012 Nicholson et al.
2012/0143363 A1 6/2012 Liu et al.
2012/0179461 A1 7/2012 Every et al.
2012/0179462 A1 7/2012 Klein
2012/0182429 A1 7/2012 Forutanpour et al.
2012/0197898 A1 8/2012 Pandey et al.
2012/0220347 A1 8/2012 Davidson
2012/0237037 A1 9/2012 Ninan et al.
2012/0249785 A1 10/2012 Sudo et al.
2012/0250871 A1 10/2012 Lu et al.
2013/0011111 A1 1/2013 Abraham et al.
2013/0024190 A1 1/2013 Fairey
2013/0034243 A1 2/2013 Yermeche et al.
2013/0051543 A1 2/2013 McDysan et al.
2013/0096914 A1 4/2013 Avendano et al.
2013/0182857 A1 7/2013 Namba et al.
2013/0196715 A1 8/2013 Hansson et al.
2013/0231925 A1 9/2013 Avendano et al.
2013/0251170 A1 9/2013 Every et al.
2013/0268280 A1 10/2013 Del Galdo et al.
2013/0318613 A1* 11/2013 Archer .................. G06F 21/577 726/25
2014/0032470 A1* 1/2014 McCarthy .............. G06Q 10/20 706/47
2014/0039888 A1 2/2014 Taubman et al.
2014/0098964 A1 4/2014 Rosca et al.
2014/0108020 A1 4/2014 Sharma et al.
2014/0112496 A1 4/2014 Murgia et al.
2014/0142958 A1 5/2014 Sharma et al.
2014/0241702 A1 8/2014 Solbach et al.
2014/0337016 A1 11/2014 Herbig et al.
2015/0025881 A1 1/2015 Carlos et al.
2015/0030163 A1 1/2015 Sokolov
2015/0100311 A1 4/2015 Kar et al.
2016/0027451 A1 1/2016 Solbach et al.
2016/0063997 A1 3/2016 Nemala et al.
2016/0066089 A1 3/2016 Klein

FOREIGN PATENT DOCUMENTS

EP 1474755 A1 11/2004
FI 20080428 A 7/2008
FI 20100431 A 12/2010
FI 20125812 10/2012
FI 20135038 4/2013
FI 124716 12/2014
JP 62110349 5/1987
JP 4184400 B2 7/1992
JP 5053587 B2 3/1993
JP 6269083 9/1994
JP H07248793 9/1995
JP H10-313497 11/1998
JP H11-249693 9/1999
JP 2001159899 A 6/2001
JP 2002366200 A 12/2002
JP 2002542689 A 12/2002
JP 2003514473 A 4/2003
JP 2003271191 A 9/2003
JP 2004187283 A 7/2004
JP 2005110127 A 4/2005
JP 2005518118 A 6/2005
JP 2005195955 A 7/2005
JP 2006094522 A 4/2006
JP 2006337415 A 12/2006
JP 2007006525 A 1/2007
JP 2008015443 A 1/2008
JP 2008135933 A 6/2008
JP 2009522942 A 6/2009
JP 2010532879 A 10/2010
JP 2011527025 A 10/2011
JP 5007442 B2 6/2012
JP 2013517531 A 5/2013
JP 2013534651 A 9/2013
JP 5762956 B2 6/2015
KR 1020080092404 10/2008
KR 1020100041741 4/2010
KR 1020110038024 4/2011
KR 1020120116442 10/2012
KR 101210313 B1 12/2012
KR 1020130117750 10/2013
KR 101461141 B1 11/2014
KR 101610656 B1 4/2016
TW 526468 4/2003
TW 200305854 A 11/2003
TW 200629240 8/2006
TW I279776 4/2007
TW 200910793 A 3/2009
TW 201009817 A 3/2010
TW 201214418 A 4/2012
TW I463817 12/2014
TW I465121 12/2014
TW 201513099 A 4/2015
TW I488179 6/2015
WO WO0137265 5/2001

(56) References Cited

FOREIGN PATENT DOCUMENTS

| | | | |
|---|---|---|---|
| WO | WO0141504 | A1 | 6/2001 |
| WO | WO0156328 | | 8/2001 |
| WO | WO0174118 | | 10/2001 |
| WO | WO03043374 | | 5/2003 |
| WO | WO03069499 | | 8/2003 |
| WO | WO2006027707 | A1 | 3/2006 |
| WO | WO2007001068 | A1 | 1/2007 |
| WO | WO2007049644 | A1 | 5/2007 |
| WO | WO2007081916 | A2 | 7/2007 |
| WO | WO2008045476 | A2 | 4/2008 |
| WO | WO2008101198 | A2 | 8/2008 |
| WO | WO2009008998 | A1 | 1/2009 |
| WO | WO2010005493 | A1 | 1/2010 |
| WO | WO2011091068 | A1 | 7/2011 |
| WO | WO2011129725 | A1 | 10/2011 |
| WO | WO2012009047 | A1 | 1/2012 |
| WO | WO2012097016 | A1 | 7/2012 |
| WO | WO2014063099 | A1 | 4/2014 |
| WO | WO2014131054 | A2 | 8/2014 |
| WO | WO2015010129 | A1 | 1/2015 |
| WO | WO2016033364 | A1 | 3/2016 |

OTHER PUBLICATIONS

Allen, Jont B. et al., "A Unified Approach to Short-Time Fourier Analysis and Synthesis", Proceedings of the IEEE vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al., "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al., "New Insights into the Noise Reduction Wiener Filter", IEEE Transactions on Audio, Speech, and Language Processing. vol. 14, No. 4, Jul. 2006, pp. 1218-1234.

Cohen, Israel et al., "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"Ent 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al., "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International aonference on Acoustics, Speech, and Signal Processing, pp. 220-223.

Goubran, R.A. et al., "Acoustic Noise Suppression Using Regressive Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al., "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, Lloyd A. et al., "A Place Theory of Sound Localization," Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.

Kates, James M. "A Time-Domain Digital Cochlear Model", IEEE Transactions on Signal Processing, Dec. 1991, vol. 39, No. 12, pp. 2573-2592.

Kato et al., "Noise Suppression with High Speech Quality Based on Weighted Noise Estimation and MMSE STSA" Proc. IWAENC [Online] 2001, pp. 183-186.

Lazzaro, John et al., "A Silicon Model of Auditory Localization," Neural Computation Spring 1989, vol. 1, pp. 47-57, Massachusetts Institute of Technology.

Lippmann, Richard P. "Speech Recognition by Machines and Humans", Speech Communication, Jul. 1997, vol. 22, No. 1, pp. 1-15.

Liu, Chen et al., "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.

Martin, Rainer et al., "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.

Martin, Rainer "Spectral Subtraction Based on Minimum Statistics", in Proceedings Europe. Signal Processing Conf., 1994, pp. 1182-1185.

Mitra, Sanjit K. Digital Signal Processing: a Computer-based Approach. 2nd Ed. 2001. pp. 131-133.

Mizumachi, Mitsunori et al., "Noise Reduction by Paired-Microphones Using Spectral Subtraction", 1998 IEEE International Conference on Acoustics, Speech and Signal Processing, May 12-15. pp. 1001-1004.

Moonen, Marc et al., "Multi-Microphone Signal Enhancement Techniques for Noise Suppression and Dereverbration," http://www.esat.kuleuven.ac.be/sista/yearreport97//node37.html, accessed on Apr. 21, 1998.

Watts, Lloyd Narrative of Prior Disclosure of Audio Display on Feb. 15, 2000 and May 31, 2000.

Cosi, Piero et al., (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.

Parra, Lucas et al., "Convolutive Blind Separation of Non-Stationary Sources", IEEE Transactions on Speech and Audio Processing. vol. 8, No. 3, May 2008, pp. 320-327.

Rabiner, Lawrence R. et al., "Digital Processing of Speech Signals", (Prentice-Hall Series in Signal Processing). Upper Saddle River, NJ: Prentice Hall, 1978.

Weiss, Ron et al., "Estimating Single-Channel Source Separation Masks: Revelance Vector Machine Classifiers vs. Pitch-Based Masking", Workshop on Statistical and Perceptual Audio Processing, 2006.

(56) References Cited

OTHER PUBLICATIONS

Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al., "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Soon et al., "Low Distortion Speech Enhancement" Proc. Inst. Elect. Eng. [Online] 2000, vol. 147, pp. 247-253.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al., "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al., "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
Non-Final Office Action, Oct. 27, 2003, U.S. Appl. No. 09/534,682, filed Mar. 24, 2000.
Non-Final Office Action, Feb. 10, 2004, U.S. Appl. No. 09/534,682, filed Mar. 24, 2000.
Final Office Action, Dec. 17, 2004, U.S. Appl. No. 09/534,682, filed Mar. 24, 2000.
Non-Final Office Action, Apr. 20, 2005, U.S. Appl. No. 09/534,682, filed Mar. 24, 2000.
Notice of Allowance, Oct. 26, 2005, U.S. Appl. No. 09/534,682, filed Mar. 24, 2000.
Non-Final Office Action, May 3, 2005, U.S. Appl. No. 09/993,442, filed Nov. 13, 2001.
Final Office Action, Oct. 19, 2005, U.S. Appl. No. 09/993,442, filed Nov. 13, 2001.
Advisory Action, Jan. 20, 2006, U.S. Appl. No. 09/993,442, filed Nov. 13, 2001.
Non-Final Office Action, May 17, 2006, U.S. Appl. No. 09/993,442, filed Nov. 13, 2001.
Non-Final Office Action, Nov. 16, 2006, U.S. Appl. No. 09/993,442, filed Nov. 13, 2001.
Final Office Action, Jun. 15, 2007, U.S. Appl. No. 09/993,442, filed Nov. 13, 2001.
Non-Final Office Action, Oct. 8, 2003, U.S. Appl. No. 10/004,141, filed Nov. 14, 2001.
Notice of Allowance, Feb. 24, 2004, U.S. Appl. No. 10/004,141, filed Nov. 14, 2001.
Non-Final Office Action, May 9, 2003, U.S. Appl. No. 10/074,991, filed Feb. 13, 2002.
Notice of Allowance, Jun. 4, 2003, U.S. Appl. No. 10/074,991, filed Feb. 13, 2002.
Non-Final Office Action, Jun. 26, 2006, U.S. Appl. No. 10/074,991, filed Feb. 13, 2002.
Final Office Action, Feb. 23, 2007, U.S. Appl. No. 10/074,991, filed Feb. 13, 2002.
Non-Final Office Action, Oct. 6, 2005, U.S. Appl. No. 10/177,049, filed Jun. 21, 2002.
Final Office Action, Mar. 28, 2006, U.S. Appl. No. 10/177,049, filed Jun. 21, 2002.
Advisory Action, Jun. 19, 2006, U.S. Appl. No. 10/177,049, filed Jun. 21, 2002.
Non-Final Office Action, Dec. 13, 2006, U.S. Appl. No. 10/613,224, filed Jul. 3, 2003.
Non-Final Office Action, Jun. 13, 2007, U.S. Appl. No. 10/613,224, filed Jul. 3, 2003.
Non-Final Office Action, Jun. 13, 2006, U.S. Appl. No. 10/840,201, filed May 5, 2004.
Non-Final Office Action, Mar. 30, 2010, U.S. Appl. No. 11/343,524, filed Jan. 30, 2006.
Non-Final Office Action, Sep. 13, 2010, U.S. Appl. No. 11/343,524, filed Jan. 30, 2006.
Final Office Action, Mar. 30, 2011, U.S. Appl. No. 11/343,524, filed Jan. 30, 2006.
Final Office Action, May 21, 2012, U.S. Appl. No. 11/343,524, filed Jan. 30, 2006.
Notice of Allowance, Oct. 9, 2012, U.S. Appl. No. 11/343,524, filed Jan. 30, 2006.
Non-Final Office Action, Aug. 5, 2008, U.S. Appl. No. 11/441,675, filed May 25, 2006.
Non-Final Office Action, Jan. 21, 2009, U.S. Appl. No. 11/441,675, filed May 25, 2006.
Final Office Action, Sep. 3, 2009, U.S. Appl. No. 11/441,675, filed May 25, 2006.
Non-Final Office Action, May 10, 2011, U.S. Appl. No. 11/441,675, filed May 25, 2006.
Final Office Action, Oct. 24, 2011, U.S. Appl. No. 11/441,675, filed May 25, 2006.
Notice of Allowance, Feb. 13, 2012, U.S. Appl. No. 11/441,675, filed May 25, 2006.
Non-Final Office Action, Apr. 7, 2011, U.S. Appl. No. 11/699,732, filed Jan. 29, 2007.
Final Office Action, Dec. 6, 2011, U.S. Appl. No. 11/699,732, filed Jan. 29, 2007.
Advisory Action, Feb. 14, 2012, U.S. Appl. No. 11/699,732, filed Jan. 29, 2007.
Notice of Allowance, Mar. 15, 2012, U.S. Appl. No. 11/699,732, filed Jan. 29, 2007.
Non-Final Office Action, Aug. 18, 2010, U.S. Appl. No. 11/825,563, filed Jul. 6, 2007.
Final Office Action, Apr. 28, 2011, U.S. Appl. No. 11/825,563, filed Jul. 6, 2007.
Non-Final Office Action, Apr. 24, 2013, U.S. Appl. No. 11/825,563, filed Jul. 6, 2007.
Final Office Action, Dec. 30, 2013, U.S. Appl. No. 11/825,563, filed Jul. 6, 2007.
Notice of Allowance, Mar. 25, 2014, U.S. Appl. No. 11/825,563, filed Jul. 6, 2007.
Non-Final Office Action, Oct. 3, 2011, U.S. Appl. No. 12/004,788, filed Dec. 21, 2007.
Notice of Allowance, Feb. 23, 2012, U.S. Appl. No. 12/004,788, filed Dec. 21, 2007.
Non-Final Office Action, Sep. 14, 2011, U.S. Appl. No. 12/004,897, filed Dec. 21, 2007.
Notice of Allowance, Jan. 27, 2012, U.S. Appl. No. 12/004,897, filed Dec. 21, 2007.
Non-Final Office Action, Jul. 28, 2011, U.S. Appl. No. 12/072,931, filed Feb. 29, 2008.

(56) References Cited

OTHER PUBLICATIONS

Notice of Allowance, Mar. 1, 2012, U.S. Appl. No. 12/072,931, filed Feb. 29, 2008.
Notice of Allowance, Mar. 1, 2012, U.S. Appl. No. 12/080,115, filed Mar. 31, 2008.
Non-Final Office Action, Nov. 14, 2011, U.S. Appl. No. 12/215,980, filed Jun. 30, 2008.
Final Office Action, Apr. 24, 2012, U.S. Appl. No. 12/215,980, filed Jun. 30, 2008.
Advisory Action, Jul. 3, 2012, U.S. Appl. No. 12/215,980, filed Jun. 30, 2008.
Non-Final Office Action, Mar. 11, 2014, U.S. Appl. No. 12/215,980, filed Jun. 30, 2008.
Final Office Action, Jul. 11, 2014, U.S. Appl. No. 12/215,980, filed Jun. 30, 2008.
Non-Final Office Action, Dec. 8, 2014, U.S. Appl. No. 12/215,980, filed Jun. 30, 2008.
Notice of Allowance, Jul. 7, 2015, U.S. Appl. No. 12/215,980, filed Jun. 30, 2008.
Non-Final Office Action, Jul. 13, 2011, U.S. Appl. No. 12/217,076, filed Jun. 30, 2008.
Final Office Action, Nov. 16, 2011, U.S. Appl. No. 12/217,076, filed Jun. 30, 2008.
Non-Final Office Action, Mar. 14, 2012, U.S. Appl. No. 12/217,076, filed Jun. 30, 2008.
Final Office Action, Sep. 19, 2012, U.S. Appl. No. 12/217,076, filed Jun. 30, 2008.
Notice of Allowance, Apr. 15, 2013, U.S. Appl. No. 12/217,076, filed Jun. 30, 2008.
Non-Final Office Action, Sep. 1, 2011, U.S. Appl. No. 12/286,909, filed Oct. 2, 2008.
Notice of Allowance, Feb. 28, 2012, U.S. Appl. No. 12/286,909, filed Oct. 2, 2008.
Non-Final Office Action, Nov. 15, 2011, U.S. Appl. No. 12/286,995, filed Oct. 2, 2008.
Final Office Action, Apr. 10, 2012, U.S. Appl. No. 12/286,995, filed Oct. 2, 2008.
Notice of Allowance, Mar. 13, 2014, U.S. Appl. No. 12/286,995, filed Oct. 2, 2008.
Non-Final Office Action, Dec. 28, 2011, U.S. Appl. No. 12/288,228, filed Oct. 16, 2008.
Non-Final Office Action, Dec. 30, 2011, U.S. Appl. No. 12/422,917, filed Apr. 13, 2009.
Final Office Action, May 14, 2012, U.S. Appl. No. 12/422,917, filed Apr. 13, 2009.
Advisory Action, Jul. 27, 2012, U.S. Appl. No. 12/422,917, filed Apr. 13, 2009.
Notice of Allowance, Sep. 11, 2014, U.S. Appl. No. 12/422,917, filed Apr. 13, 2009.
Non-Final Office Action, Jun. 20, 2012, U.S. Appl. No. 12/649,121, filed Dec. 29, 2009.
Final Office Action, Nov. 28, 2012, U.S. Appl. No. 12/649,121, filed Dec. 29, 2009.
Advisory Action, Feb. 19, 2013, U.S. Appl. No. 12/649,121, filed Dec. 29, 2009.
Notice of Allowance, Mar. 19, 2013, U.S. Appl. No. 12/649,121, filed Dec. 29, 2009.
Non-Final Office Action, Feb. 19, 2013, U.S. Appl. No. 12/944,659, filed Nov. 11, 2010.
Notice of Allowance, May 25, 2011, U.S. Appl. No. 13/016,916, filed Jan. 28, 2011.
Notice of Allowance, Aug. 4, 2011, U.S. Appl. No. 13/016,916, filed Jan. 28, 2011.
Non-Final Office Action, Nov. 22, 2013, U.S. Appl. No. 13/363,362, filed Jan. 31, 2012.
Final Office Action, Sep. 12, 2014, U.S. Appl. No. 13/363,362, filed Jan. 31, 2012.
Non-Final Office Action, Oct. 28, 2015, U.S. Appl. No. 13/363,362, filed Jan. 31, 2012.
Non-Final Office Action, Dec. 4, 2013, U.S. Appl. No. 13/396,568, filed Feb. 14, 2012.
Final Office Action, Sep. 23, 2014, U.S. Appl. No. 13/396,568, filed Feb. 14, 2012.
Non-Final Office Action, Nov. 5, 2015, U.S. Appl. No. 13/396,568, filed Feb. 14, 2012.
Non-Final Office Action, Sep. 17, 2013, U.S. Appl. No. 13/397,597, filed Feb. 15, 2012.
Final Office Action, Apr. 1, 2014, U.S. Appl. No. 13/397,597, filed Feb. 15, 2012.
Non-Final Office Action, Nov. 21, 2014, U.S. Appl. No. 13/397,597, filed Feb. 15, 2012.
Non-Final Office Action, Jun. 7, 2012, U.S. Appl. No. 13/426,436, filed Mar. 21, 2012.
Final Office Action, Dec. 31, 2012, U.S. Appl. No. 13/426,436, filed Mar. 21, 2012.
Non-Final Office Action, Sep. 12, 2013, U.S. Appl. No. 13/426,436, filed Mar. 21, 2012.
Notice of Allowance, Jul. 16, 2014, U.S. Appl. No. 13/426,436, filed Mar. 21, 2012.
Non-Final Office Action, Jul. 15, 2014, U.S. Appl. No. 13/432,490, filed Mar. 28, 2012.
Notice of Allowance, Apr. 3, 2015, U.S. Appl. No. 13/432,490, filed Mar. 28, 2012.
Notice of Allowance, Oct. 17, 2012, U.S. Appl. No. 13/565,751, filed Aug. 2, 2012.
Non-Final Office Action, Jan. 9, 2012, U.S. Appl. No. 13/664,299, filed Oct. 30, 2012.
Non-Final Office Action, Dec. 28, 2012, U.S. Appl. No. 13/664,299, filed Oct. 30, 2012.
Non-Final Office Action, Mar. 7, 2013, U.S. Appl. No. 13/664,299, filed Oct. 30, 2012.
Final Office Action, Apr. 29, 2013, U.S. Appl. No. 13/664,299, filed Oct. 30, 2012.
Non-Final Office Action, Nov. 27, 2013, U.S. Appl. No. 13/664,299, filed Oct. 30, 2012.
Notice of Allowance, Jan. 30, 2014, U.S. Appl. No. 13/664,299, filed Oct. 30, 2012.
Non-Final Office Action, Jun. 4, 2013, U.S. Appl. No. 13/705,132, filed Dec. 4, 2012.
Final Office Action, Dec. 19, 2013, U.S. Appl. No. 13/705,132, filed Dec. 4, 2012.
Notice of Allowance, Jun. 19, 2014, U.S. Appl. No. 13/705,132, filed Dec. 4, 2012.
Non-Final Office Action, May 21, 2015, U.S. Appl. No. 14/189,817, filed Feb. 25, 2014.
Final Office Action, Dec. 15, 2015, U.S. Appl. No. 14/189,817, filed Feb. 25, 2014.
Notice of Allowance, Oct. 7, 2014, U.S. Appl. No. 14/207,096, filed Mar. 12, 2014.
Non-Final Office Action, Oct. 28, 2015, U.S. Appl. No. 14/216,567, filed Mar. 17, 2014.
Non-Final Office Action, Jul. 10, 2014, U.S. Appl. No. 14/279,092, filed May 15, 2014.
Notice of Allowance, Jan. 29, 2015, U.S. Appl. No. 14/279,092, filed May 15, 2014.
Non-Final Office Action, Feb. 27, 2015, U.S. Appl. No. 14/336,934, filed Jul. 21, 2014.
Notice of Allowance, Aug. 28, 2015, U.S. Appl. No. 14/336,934, filed Jul. 21, 2014.
International Search Report dated Jun. 8, 2001 in Patent Cooperation Treaty Application No. PCT/US2001/008372.
International Search Report dated Apr. 3, 2003 in Patent Cooperation Treaty Application No. PCT/US2002/036946.
International Search Report dated May 29, 2003 in Patent Cooperation Treaty Application No. PCT/US2003/004124.
International Search Report and Written Opinion dated Oct. 19, 2007 in Patent Cooperation Treaty Application No. PCT/US2007/000463.
International Search Report and Written Opinion dated Apr. 9, 2008 in Patent Cooperation Treaty Application No. PCT/US2007/021654.

(56) References Cited

OTHER PUBLICATIONS

International Search Report and Written Opinion dated Sep. 16, 2008 in Patent Cooperation Treaty Application No. PCT/US2007/012628.
International Search Report and Written Opinion dated Oct. 1, 2008 in Patent Cooperation Treaty Application No. PCT/US2008/008249.
International Search Report and Written Opinion dated Aug. 27, 2009 in Patent Cooperation Treaty Application No. PCT/US2009/003813.
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
Demol, M. et al., "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.
Bach et al., Learning Spectral Clustering with application to spech separation, Journal of machine learning research, 2006.
Mokbel et al., 1995, IEEE Transactions of Speech and Audio Processing, vol. 3, No. 5, Sep. 1995, pp. 346-356.
Office Action mailed Oct. 14, 2013 in Taiwanese Patent Application 097125481, filed Jul. 4, 2008.
Office Action mailed Oct. 29, 2013 in Japanese Patent Application 2011-516313, filed Jun. 26, 2009.
Office Action mailed Dec. 20, 2013 in Taiwanese Patent Application 096146144, filed Dec. 4, 2007.
Office Action mailed Dec. 9, 2013 in Finnish Patent Application 20100431, filed Jun. 26, 2009.
Office Action mailed Jan. 20, 2014 in Finnish Patent Application 20100001, filed Jul. 3, 2008.
Office Action mailed Mar. 10, 2014 in Taiwanese Patent Application 097125481, filed Jul. 4, 2008.
Bai et al., "Upmixing and Downmixing Two-channel Stereo Audio for Consumer Electronics". IEEE Transactions on Consumer Electronics [Online] 2007, vol. 53, Issue 3, pp. 1011-1019.
Jo et al., "Crosstalk cancellation for spatial sound reproduction in portable devices with stereo loudspeakers". Communications in Computer and Information Science [Online] 2011, vol. 266, pp. 114-123.
Nongpuir et al., "NEXT cancellation system with improved convergence rate and tracking performance". IEEE Proceedings—Communications [Online] 2005, vol. 152, Issue 3, pp. 378-384.
Ahmed et al., "Blind Crosstalk Cancellation for DMT Systems" IEEE—Emergent Technologies Technical Committee. Sep. 2002. pp. 1-5.
Allowance mailed May 21, 2014 in Finnish Patent Application 20100001, filed Jan. 4, 2010.
Office Action mailed May 2, 2014 in Taiwanese Patent Application 098121933, filed Jun. 29, 2009.
Office Action mailed Apr. 15, 2014 in Japanese Patent Application 2010-514871, filed Jul. 3, 2008.
Elhilali et al.,"A cocktail party with a cortical twist: How cortical mechanisms contribute to sound segregation." J Acoust Soc Am. Dec. 2008; 124(6): 3751-3771).
Jin et al., "HMM-Based Multipitch Tracking for Noisy and Reverberant Speech."
Kawahara, W., et al., "Tandem-Straight: A temporally stable power spectral representation for periodic signals and applications to interference-free spectrum, F0, and aperiodicity estimation." IEEE ICASSP 2008.
Office Action mailed Jun. 27, 2014 in Korean Patent Application No. 10-2010-7000194, filed Jan. 6, 2010.
Office Action mailed Jun. 18, 2014 in Finnish Patent Application No. 20080428, filed Jul. 4, 2008.
International Search Report & Written Opinion dated Jul. 15, 2014 in Patent Cooperation Treaty Application No. PCT/US2014/018443, filed Feb. 25, 2014.
Notice of Allowance dated Aug. 26, 2014 in Taiwanese Application No. 096146144, filed Dec. 4, 2007.
Notice of Allowance dated Sep. 16, 2014 in Korean Application No. 10-2010-7000194, filed Jul. 3, 2008.
Notice of Allowance dated Sep. 29, 2014 in Taiwanese Application No. 097125481, filed Jul. 4, 2008.
Notice of Allowance dated Oct. 10, 2014 in Finnish Application No. 20100001, filed Jul. 3, 2008.
International Search Report & Written Opinion dated Nov. 12, 2014 in Patent Cooperation Treaty Application No. PCT/US2014/047458, filed Jul. 21, 2014.
Office Action mailed Oct. 28, 2014 in Japanese Patent Application No. 2011-516313, filed Dec. 27, 2012.
Heiko Purnhagen, "Low Complexity Parametric Stereo Coding in MPEG-4," Proc. of the 7th Int. Conference on Digital Audio Effects (DAFx'04), Naples, Italy, Oct. 5-8, 2004.
Chun-Ming Chang et al., "Voltage-Mode Multifunction Filter with Single Input and Three Outputs Using Two Compound Current Conveyors" IEEE Transactions on Circuits and Systems-I: Fundamental Theory and Applications, vol. 46, No. 11, Nov. 1999.
Notice of Allowance mailed Feb. 10, 2015 in Taiwanese Patent Application No. 098121933, filed Jun. 29, 2009.
Office Action mailed Jan. 30, 2015 in Finnish Patent Application No. 20080623, filed May 24, 2007.
Office Action mailed Mar. 24, 2015 in Japanese Patent Application No. 2011-516313, filed Jun. 26, 2009.
Office Action mailed Apr. 16, 2015 in Korean Patent Application No. 10-2011-7000440, filed Jun. 26, 2009.
Notice of Allowance mailed Jun. 2, 2015 in Japanese Patent Application 2011-516313, filed Jun. 26, 2009.
Office Action mailed Jun. 4, 2015 in Finnish Patent Application 20080428, filed Jan. 5, 2007.
Office Action mailed Jun. 9, 2015 in Japanese Patent Application 2014-165477 filed Jul. 3, 2008.
Notice of Allowance mailed Aug. 13, 2015 in Finnish Patent Application 20080623, filed May 24, 2007.
International Search Report & Written Opinion dated Nov. 27, 2015 in Patent Cooperation Treaty Application No. PCT/US2015/047263, filed Aug. 27, 2015.
International Search Report and Written Opinion dated Sep. 1, 2011 in Patent Cooperation Treaty Application No. PCT/US11/37250.
Fazel et al., "An overview of statistical pattern recognition techniques for speaker verification," IEEE, May 2011.
Sundaram et al., "Discriminating Two Types of Noise Sources Using Cortical Representation and Dimension Reduction Technique," IEEE, 2007.
Tognieri et al., "A Comparison of the LBG, LVQ, MLP, SOM and GMM Algorithms for Vector Quantisation and Clustering Analysis," University of Western Australia, 1992.
Klautau et al., "Discriminative Gaussian Mixture Models a Comparison with Kernel Classifiers," ICML, 2003.
International Search Report & Written Opinion dated Mar. 18, 2014 in Patent Cooperation Treaty Application No. PCT/US2013/065752, filed Oct. 18, 2013.
Kim et al., "Improving Speech Intelligibility in Noise Using Environment-Optimized Algorithms," IEEE Transactions on Audio, Speech, and Language Processing, vol. 18, No. 8, Nov. 2010, pp. 2080-2090.
Sharma et al., "Rotational Linear Discriminant Analysis Technique for Dimensionality Reduction," IEEE Transactions on Knowledge and Data Engineering, vol. 20, No. 10, Oct. 2008, pp. 1336-1347.

(56) References Cited

OTHER PUBLICATIONS

Temko et al., "Classifiation of Acoustic Events Using SVM-Based Clustering Schemes," Pattern Recognition 39, No. 4, 2006, pp. 682-694.
Office Action mailed Jun. 17, 2015 in Japan Patent Application 2013-519682 filed May 19, 2011.
Notice of Allowance dated Feb. 24, 2016 in Korean Application No. 10-2011-7000440, filed Jun. 26, 2009.
Hu et al., "Robust Speaker's Location Detection in a Vehicle Environment Using GMM Models," IEEE Transactions on Systems, Man, and Cybernetics—Part B: Cybernetics, vol. 36, No. 2, Apr. 2006, pp. 403-412.
Laroche, Jean et al., "Noise Suppression Assisted Automatic Speech Recognition", U.S. Appl. No. 12/962,519, filed Dec. 7, 2010.
Goodwin, Michael M. et al., "Key Click Suppression", U.S. Appl. No. 14/745,176, filed Jun. 19, 2015.
Non-Final Office Action, Aug. 1, 2012, U.S. Appl. No. 12/860,043, filed Aug. 20, 2010.
Notice of Allowance, Jan. 18, 2013, U.S. Appl. No. 12/860,043, filed Aug. 22, 2010.
Non-Final Office Action, Aug. 17, 2012, U.S. Appl. No. 12/868,622, filed Aug. 25, 2010.
Final Office Action, Feb. 22, 2013, U.S. Appl. No. 12/868,622, filed Aug. 25, 2010.
Advisory Action, May 14, 2013, U.S. Appl. No. 12/868,622, filed Aug. 25, 2010.
Notice of Allowance, May 1, 2014, U.S. Appl. No. 12/868,622, filed Aug. 25, 2010.
Non-Final Office Action, Jun. 26, 2013, U.S. Appl. No. 12/959,994, filed Dec. 3, 2010.
Non-Final Office Action, Jul. 21, 2014, U.S. Appl. No. 12/959,994, filed Dec. 3, 2010.
Non-Final Office Action, May 20, 2015, U.S. Appl. No. 12/959,994, filed Dec. 3, 2010.
Final Office Action, Jan. 12, 2016, U.S. Appl. No. 12/959,994, filed Dec. 3, 2010.
Non-Final Office Action, May 13, 2014, U.S. Appl. No. 12/962,519, filed Dec. 7, 2010.
Final Office Action, Feb. 10, 2015, U.S. Appl. No. 12/962,519, filed Dec. 7, 2010.
Non-Final Office Action, Nov. 3, 2015, U.S. Appl. No. 12/962,519, filed Dec. 7, 2010.
Final Office Action, May 18, 2016, U.S. Appl. No. 12/962,519, filed Dec. 7, 2010.
Non-Final Office Action, Jan. 2, 2013, U.S. Appl. No. 12/963,493, filed Dec. 8, 2010.
Final Office Action, May 7, 2013, U.S. Appl. No. 12/963,493, filed Dec. 8, 2010.
Non-Final Office Action, Jul. 31, 2014, U.S. Appl. No. 12/963,493, filed Dec. 8, 2010.
Non-Final Office Action, May 15, 2015, U.S. Appl. No. 12/963,493, filed Dec. 8, 2010.
Notice of Allowance, Oct. 3, 2013, U.S. Appl. No. 13/157,238, filed Jun. 9, 2011.
Final Office Action, May 5, 2016, U.S. Appl. No. 13/363,362, filed Jan. 31, 2012.
Non-Final Office Action, Jan. 31, 2013, U.S. Appl. No. 13/414,121, filed Mar. 7, 2012.
Notice of Allowance, Jul. 29, 2013, U.S. Appl. No. 13/414,121, filed Mar. 7, 2012.
Non-Final Office Action, May 11, 2012, U.S. Appl. No. 13/424,189, filed Mar. 19, 2012.
Final Office Action, Sep. 4, 2012, U.S. Appl. No. 13/424,189, filed Mar. 19, 2012.
Final Office Action, Nov. 28, 2012, U.S. Appl. No. 13/424,189, filed Mar. 19, 2012.
Notice of Allowance, Mar. 7, 2013, U.S. Appl. No. 13/424,189, filed Mar. 19, 2012.
Non-Final Office Action, Nov. 7, 2012, U.S. Appl. No. 13/492,780, filed Jun. 8, 2012.
Non-Final Office Action, May 8, 2013, U.S. Appl. No. 13/492,780, filed Jun. 8, 2012.
Final Office Action, Oct. 23, 2013, U.S. Appl. No. 13/492,780, filed Jun. 8, 2012.
Notice of Allowance, Nov. 24, 2014, U.S. Appl. No. 13/492,780, filed Jun. 8, 2012.
Non-Final Office Action, Oct. 8, 2013, U.S. Appl. No. 13/734,208, filed Jan. 4, 2013.
Notice of Allowance, Jan. 31, 2014, U.S. Appl. No. 13/734,208, filed Jan. 4, 2013.
Non-Final Office Action, May 28, 2013, U.S. Appl. No. 13/735,446, filed Jan. 7, 2013.
Non-Final Office Action, Dec. 13, 2013, U.S. Appl. No. 13/735,446, filed Jan. 7, 2013.
Final Office Action, Apr. 9, 2014, U.S. Appl. No. 13/735,446, filed Jan. 7, 2013.
Non-Final Office Action, Sep. 29, 2014, U.S. Appl. No. 13/735,446, filed Jan. 7, 2013.
Notice of Allowance, Jul. 15, 2015, U.S. Appl. No. 13/735,446, filed Jan. 7, 2013.
Non-Final Office Action, May 23, 2014, U.S. Appl. No. 13/859,186, filed Apr. 9, 2013.
Final Office Action, Dec. 3, 2014, U.S. Appl. No. 13/859,186, filed Apr. 9, 2013.
Non-Final Office Action, Jul. 7, 2015, U.S. Appl. No. 13/859,186, filed Apr. 9, 2013.
Final Office Action, Feb. 2, 2016, U.S. Appl. No. 13/859,186, filed Apr. 9, 2013.
Notice of Allowance, Apr. 28, 2016, U.S. Appl. No. 13/859,186, filed Apr. 9, 2013.
Non-Final Office Action, Apr. 17, 2015, U.S. Appl. No. 13/888,796, filed May 7, 2013.
Notice of Allowance, May 20, 2015, U.S. Appl. No. 13/888,796, filed May 7, 2013.
Non-Final Office Action, Jul. 15, 2015, U.S. Appl. No. 14/058,059, filed Oct. 18, 2013.
Non-Final Office Action, Jun. 26, 2015, U.S. Appl. No. 14/262,489, filed Apr. 25, 2014.
Notice of Allowance, Jan. 28, 2016, U.S. Appl. No. 14/313,883, filed Jun. 24, 2014.
Non-Final Office Action, May 6, 2016, U.S. Appl. No. 14/495,550, filed Sep. 24, 2014.
Non-Final Office Action, Jun. 26, 2015, U.S. Appl. No. 14/626,489, filed Apr. 25, 2014.
Non-Final Office Action, Jun. 10, 2015, U.S. Appl. No. 14/628,109, filed Feb. 20, 2015.
Final Office Action, Mar. 16, 2016, U.S. Appl. No. 14/628,109, filed Feb. 20, 2015.
Non-Final Office Action, Apr. 8, 2016, U.S. Appl. No. 14/838,133, filed Aug. 27, 2015.
Non-Final Office Action, May 31, 2016, U.S. Appl. No. 14/874,329, filed Oct. 2, 2015.
Final Office Action, Jun. 17, 2016, U.S. Appl. No. 13/396,568, filed Feb. 14, 2012.

* cited by examiner

NOISE SUPPRESSION FOR SPEECH PROCESSING BASED ON MACHINE-LEARNING MASK ESTIMATION

CROSS REFERENCES TO RELATED APPLICATIONS

This non-provisional patent application claims priority to U.S. provisional patent application No. 61/709,908, filed Oct. 4, 2012, which is hereby incorporated by reference in its entirety.

TECHNICAL FIELD

The application generally relates to digital audio signal processing and, more specifically, to noise suppression utilizing a machine-learning framework.

BACKGROUND

An automatic speech processing engine, including, but not limited to, an automatic speech recognition (ASR) engine, in an audio device may be used to recognize spoken words or phonemes within the words in order to identify spoken commands by a user is described. Conventional automatic speech processing is sensitive to noise present in audio signals including user speech. Various noise reduction or noise suppression pre-processing techniques may offer significant benefits to operations of an automatic speech processing engine. For example, a modified frequency domain representation of an audio signal may be used to compute speech-recognition features without having to perform any transformation to the time-domain. In other examples, automatic speech processing techniques may be performed in the frequency-domain and may include applying a real, positive gain mask to the frequency domain representation of the audio signal before converting the signal back to a time-domain signal, which may be then fed to the automatic speech processing engine.

The gain mask may be computed to attenuate the audio signal such that background noise is decreased or eliminated to an extent, while the desired speech is preserved to an extent. Conventional noise suppression techniques may include dynamic noise power estimation to derive a local signal-to-noise ratio (SNR), which may then be used to derive the gain mask using either a formula (e.g., spectral subtraction, Wiener filter, and the like) or a data-driven approach (e.g., table lookup). The gain mask obtained in this manner may not be an optimal mask because an estimated SNR is often inaccurate, and the reconstructed time-domain signal may be very different from the clean speech signal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The aspects of the present disclosure provide for noise suppression techniques applicable in digital audio pre-processing for automatic speech processing systems, including but not limited to automatic speech recognition (ASR) systems. The principles of noise suppression lie in the use of a machine-learning framework trained on cues pertaining to clean and noisy speech signals. According to exemplary embodiments, the present technology may utilize a plurality of predefined clean speech signals and a plurality of predefined noise signals to train at least one machine-learning technique and map synthetically generated noisy speech signals with the cues of clean speech signals and noise signals. The trained machine-learning technique may be further used to process and decompose real audio signals into clean speech and noise signals by extracting and analyzing cues of the real audio signal. The cues may be used to dynamically generate an appropriate gain mask, which may precisely eliminate the noise components from the real audio signal. The audio signal pre-processed in such manner may then be applied to an automatic speech processing engine for corresponding interpretation or processing. In other aspects of the present disclosure, the machine-learning technique may enable extracting cues associated with clean automatic speech processing features, which may be directly used by the automatic speech processing engine.

According to one or more embodiments of the present disclosure, there is provided a computer-implemented method for noise suppression. The method may comprise the operations of receiving, by a first processor communicatively coupled with a first memory, first noisy speech, the first noisy speech obtained using two or more microphones. The method may further include extracting, by the first processor, one or more first cues from the first noisy speech, the first cues including cues associated with noise suppression and automatic speech processing. The automatic speech processing may be one or more of automatic speech recognition, language recognition, keyword recognition, speech confirmation, emotion detection, voice sensing, and speaker recognition. The method may further include creating clean automatic speech processing features using a mapping and the extracted one or more first cues, the clean automatic speech processing features being for use in automatic speech processing. The machine-learning technique may include one or more of a neural network, regression tree, a non-linear transform, a linear transform, and a Gaussian Mixture Model (GMM).

According to one or more embodiments of the present disclosure, there is provided yet another computer-implemented method for noise suppression. The method may include the operations of receiving, by a second processor communicatively coupled with a second memory, clean speech and noise; and producing, by the second processor, second noisy speech using the clean speech and the noise. The method may further include extracting, by the second processor, one or more second cues from the second noisy speech, the one or more second cues including cues associated with noise suppression and noisy automatic speech processing; and extracting clean automatic speech processing cues from the clean speech. The process may include generating, by the second processor, a mapping from the one or more second cues associated with the noise suppression cues and noisy automatic speech processing cues to clean automatic speech processing cues, the generating including at least one second machine-learning technique.

The clean speech and noise may each obtained using at least two microphones, the one or more first and second cues each including at least one inter-microphone level difference (ILD) cues and inter-microphone phase difference (IPD) cues. The automatic speech processing comprises one or more of automatic speech recognition, language recognition, keyword recognition, speech confirmation, emotion detection, voice sensing, and speaker recognition. The cues may include at least one of inter-microphone level difference (ILD) cues and inter-microphone phase difference (IPD)

cues. The cues may further include at least one of energy at channel cues, voice activity detection (VAD) cues, spatial cues, frequency cues, Wiener gain mask estimates, pitch-based cues, periodicity-based cues, noise estimates, and context cues. The machine-learning technique may include one or more of a neural network, regression tree, a non-linear transform, a linear transform, and a Gaussian Mixture Model (GMM).

According to one or more embodiments of the present disclosure, there is provided a system for noise suppression. An example system may include a first frequency analysis module configured to receive first noisy speech, the first noisy speech being each obtained using at least two microphones; a first cue extraction module configured to extract one or more first cues from the first noisy speech, the first cues including cues associated with noise suppression and automatic speech processing; and a modification module being configured to create clean automatic speech processing features using a mapping and the extracted one or more first cues. The clean automatic speech processing features being for use in automatic speech processing.

According to some embodiments, the method may include receiving, by a processor communicatively coupled with a memory, clean speech and noise, the clean speech and noise each obtained using at least two microphones; producing, by the processor, noisy speech using the clean speech and the noise; extracting, by the processor, one or more cues from the noisy speech, the cues being associated with at least two microphones; and determining, by the processor, a mapping between the cues and one or more gain coefficients using the clean speech and the noisy speech, the determining including at least one machine-learning technique.

Embodiments described herein may be practiced on any device that is configured to receive and/or provide audio such as, but not limited to, personal computers (PCs), tablet computers, phablet computers; mobile devices, cellular phones, phone handsets, headsets, media devices, and systems for teleconferencing applications.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
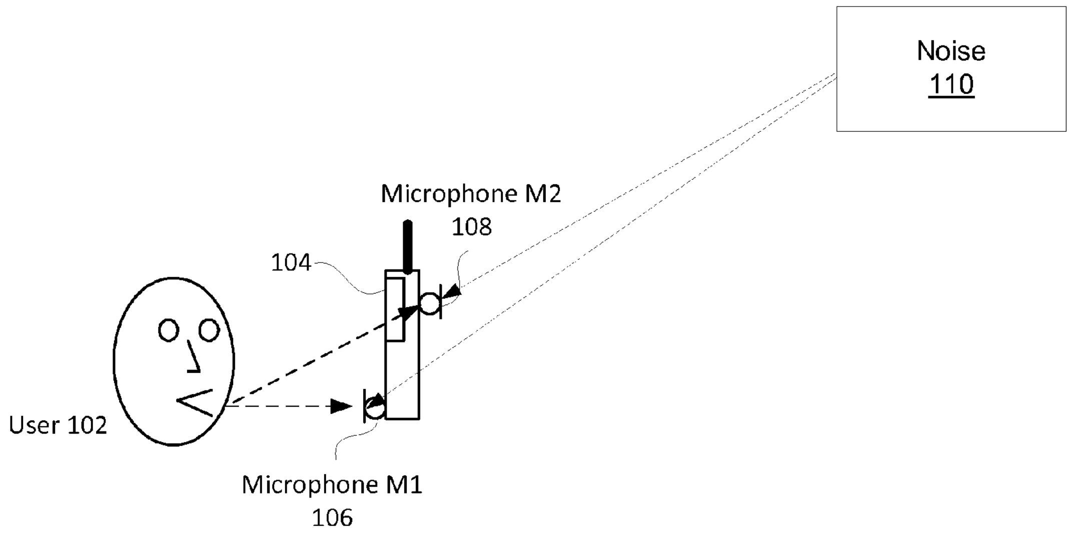
FIG. 1 is an illustration of an environment in which embodiments of the present technology may be used.

Various aspects of the subject matter disclosed herein are now described with reference to the drawings, wherein like reference numerals are used to refer to like elements throughout. In the following description, for purposes of explanation, numerous specific details are set forth to provide a thorough understanding of one or more aspects. It may be evident, however, that such aspects may be practiced without these specific details. In other instances, well-known structures and devices are shown in block diagram form to facilitate describing one or more aspects.

INTRODUCTION

The techniques of the embodiments disclosed herein may be implemented using a variety of technologies. For example, the methods described herein may be implemented in software executing on a computer system or in hardware utilizing either a combination of processors or other specially designed application-specific integrated circuits, programmable logic devices, or various combinations thereof. In particular, the methods described herein may be implemented by a series of processor-executable instructions residing on a non-transitory storage medium such as a disk drive or a processor-readable medium. The methods may be implemented in software that is cloud-based.

In general, the techniques of the embodiments disclosed herein provide for digital methods for audio signal pre-processing involving noise suppression appropriate for further use in various automatic speech processing systems. The disclosed methods for noise suppression employ one or more machine-learning algorithms for mapping cues between predetermined, reference noise signals/clean speech signals and noisy speech signals. The mapping data may be used in dynamic calculation of an appropriate gain mask estimate suitable for noise suppression.

In order to obtain a better estimate of the gain mask, embodiments of the present disclosure may use various cues extracted at various places in a noise suppression (NS) system. In addition to an estimated SNR, additional cues such as an ILD, IPD, coherence, and other intermediate features extracted by blocks upstream of the gain mask generation may be used. Cues extracted from previous or following spectral frames, as well as from adjacent frequency taps, may also be used.

The set of cues may then be used in a machine-learning framework, along with the "oracle" ideal gain mask (e.g., which may be extracted when the clean speech is available), to derive a mapping between the cues and the mask. The mapping may be implemented, for example, as one or more machine-learning algorithms including a non-linear transformation, linear transformation, statistical algorithms, neural networks, regression tree methods, GMMs, heuristic algorithms, support vector machine algorithms, k-nearest neighbor algorithms, and so forth. The mapping may be learned from a training database, and one such mapping may exist per frequency domain tap or per group of frequency domain taps.

During this processing, the extracted cues may be fed to the mapper, and the gain mask may be provided by the output of the mapper and applied to the noisy signal, yielding a "de-noised" spectral representation of the signal.

From the spectral representation, the time-domain signal may be reconstructed and provided to the ASR engine. In further embodiments, automatic speech processing specific cues may be derived from the spectral representation of the signal. The automatic speech processing cues may be but are not limited to automatic speech recognition, language recognition, keyword recognition, speech confirmation, emotion detection, voice sensing, and speaker recognition. The cues may be provided to the automatic speech processing engine directly, e.g., bypassing the automatic speech processing engine's front end. Although descriptions may be included by way of example to automatic speech recognition (ASR) and features thereof to help describe certain embodiments, various embodiments are not so limited and may include other automatic speech processing and features thereof.

Other embodiments of the present disclosure may include working directly in the automatic speech processing feature, e.g., ASR feature, domain. During the training phase, available NS cues may be produced (as discussed above), and the ASR cues may be extracted from both the clean and the noisy signals. The training phase may then learn an optimal mapping scheme that transforms the NS cues and noisy ASR cues into clean ASR features. In other words, instead of learning a mapping from the NS cues to a gain mask, the mapping may be learned directly from NS cues and noisy ASR cues to the clean ASR cues. During normal processing of input audio signal, the NS cues and noisy ASR cues provided to the mapper, which produces clean ASR cues, which in turn may be used by the ASR engine.

In various embodiments of the present disclosure, the optimal gain mask may be derived from a series of cues extracted from the input noisy signal in a data-driven or machine-learning approach. The training process for these techniques may select the cues that provide substantial information to produce a more accurate approximation of the ideal gain mask. Furthermore, in the case of the use of regression trees as machine-learning techniques, substantially informative features may be dynamically selected at run time when the tree is traversed.

These and other embodiments will be now described in greater details with respect to various embodiments and with reference to accompanying drawings.

Example System Implementation

FIG. 1 is an illustration of an environment in which embodiments of the present technology may be used. A user may act as an audio source 102 (e.g., speech source 102 or user 102) to an audio device 104. The exemplary audio device 104 may include two microphones: a primary microphone 106 relative to the audio source 102 and a secondary microphone 108 located a distance away from the primary microphone 106. Alternatively, the audio device 104 may include a single microphone. In yet other embodiments, the audio device 104 may include more than two microphones, such as, for example, three, four, five, six, seven, eight, nine, ten or even more microphones. The audio device 104 may constitute or be a part of, for example, a wireless telephone or a computer.

The primary microphone 106 and secondary microphone 108 may be omnidirectional microphones. Alternatively, embodiments may utilize other forms of microphones or acoustic sensors, such as directional microphones.

While the microphones 106 and 108 receive sound (i.e., audio signals) from the audio source 102, the microphones 106 and 108 also pick up noise 110. Although the noise 110 is shown coming from a single location in FIG. 1, the noise 110 may include any sounds from one or more locations that differ from the location of audio source 102, and may include reverberations and echoes. The noise 110 may be stationary, non-stationary, and/or a combination of both stationary and non-stationary noise.

Some embodiments may utilize level differences (e.g., energy differences) between the audio signals received by the two microphones 106 and 108. Because the primary microphone 106 is much closer to the audio source 102 than the secondary microphone 108 in a close-talk use case, the intensity level is higher for the primary microphone 106, resulting in a larger energy level received by the primary microphone 106 during a speech/voice segment, for example.

The level difference may then be used to discriminate speech and noise in the time-frequency domain. Further embodiments may use a combination of energy level differences and time delays to discriminate speech. Based on such inter-microphone differences, speech signal extraction or speech enhancement may be performed.

Figure 2:
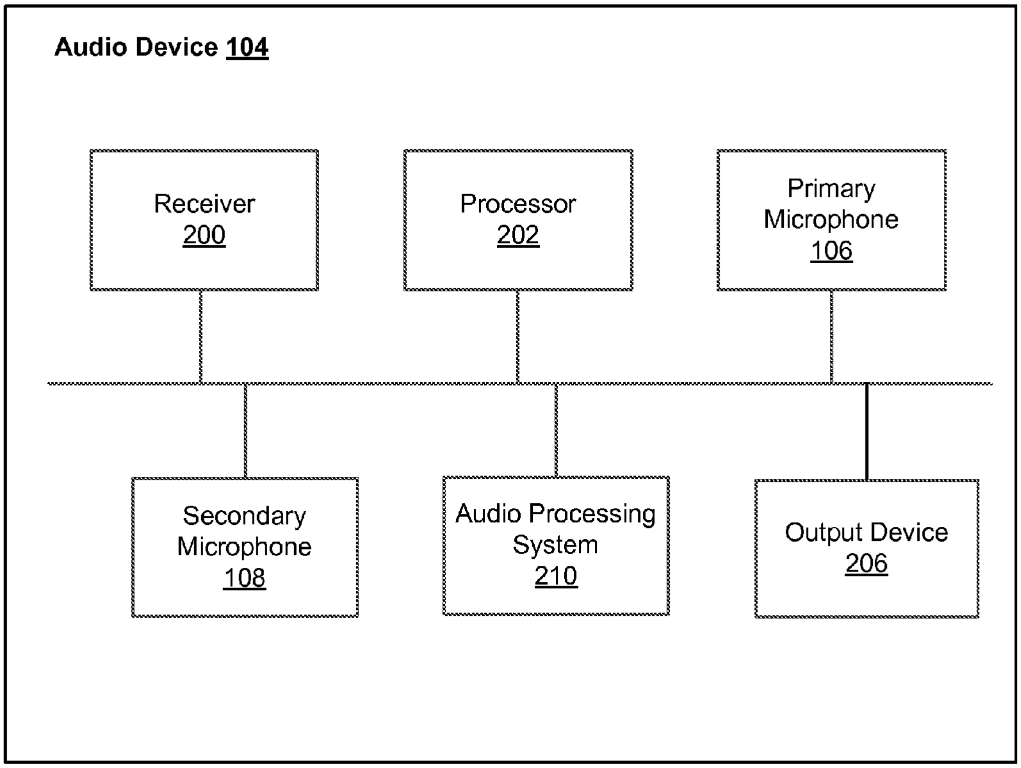
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

The processor 202 may execute instructions and modules stored in a memory (not illustrated in FIG. 2) in the audio device 104 to perform functionality described herein, including noise reduction for an audio signal. The processor 202 may include hardware and software implemented as a processing unit, which may process floating point operations and other operations for the processor 202.

The exemplary receiver 200 is an acoustic sensor configured to receive or transmit a signal from a communications network. Hence, receiver 200 may be used as a transmitter in addition to a receiver. In some embodiments, the receiver 200 may include an antenna device. The signal may then be forwarded to the audio processing system 210 to reduce noise using the techniques described herein, and provide an audio signal to the output device 206. The present technology may be used in the transmit path and/or receive path of the audio device 104.

The audio processing system 210 is configured to receive the audio signals from an acoustic source via the primary microphone 106 and secondary microphone 108 and process the audio signals. Processing may include performing noise reduction within an audio signal. The audio processing system 210 is discussed in more detail below. The primary and secondary microphones 106, 108 may be spaced a distance apart in order to allow for detecting an energy level difference, time difference, or phase difference between the audio signals received by the microphones. The audio signals received by primary microphone 106 and secondary microphone 108 may be converted into electrical signals (i.e., a primary electrical signal and a secondary electrical signal). The electrical signals may themselves be converted by an analog-to-digital converter (not shown) into digital signals for processing, in accordance with some embodiments.

In order to differentiate the audio signals for clarity purposes, the audio signal received by the primary microphone 106 is herein referred to as the primary audio signal, while the audio signal received from by the secondary microphone 108 is herein referred to as the secondary audio signal. The primary audio signal and the secondary audio signal may be processed by the audio processing system 210 to produce a signal with an improved signal-to-noise ratio. It should be noted that embodiments of the technology described herein may be practiced utilizing only the primary microphone 106.

The output device 206 is any device that provides an audio output to the user. For example, the output device 206 may include a speaker, an earpiece of a headset or handset, or a speaker on a conference device.

Noise Suppression by Estimating Gain Mask

Figure 3:
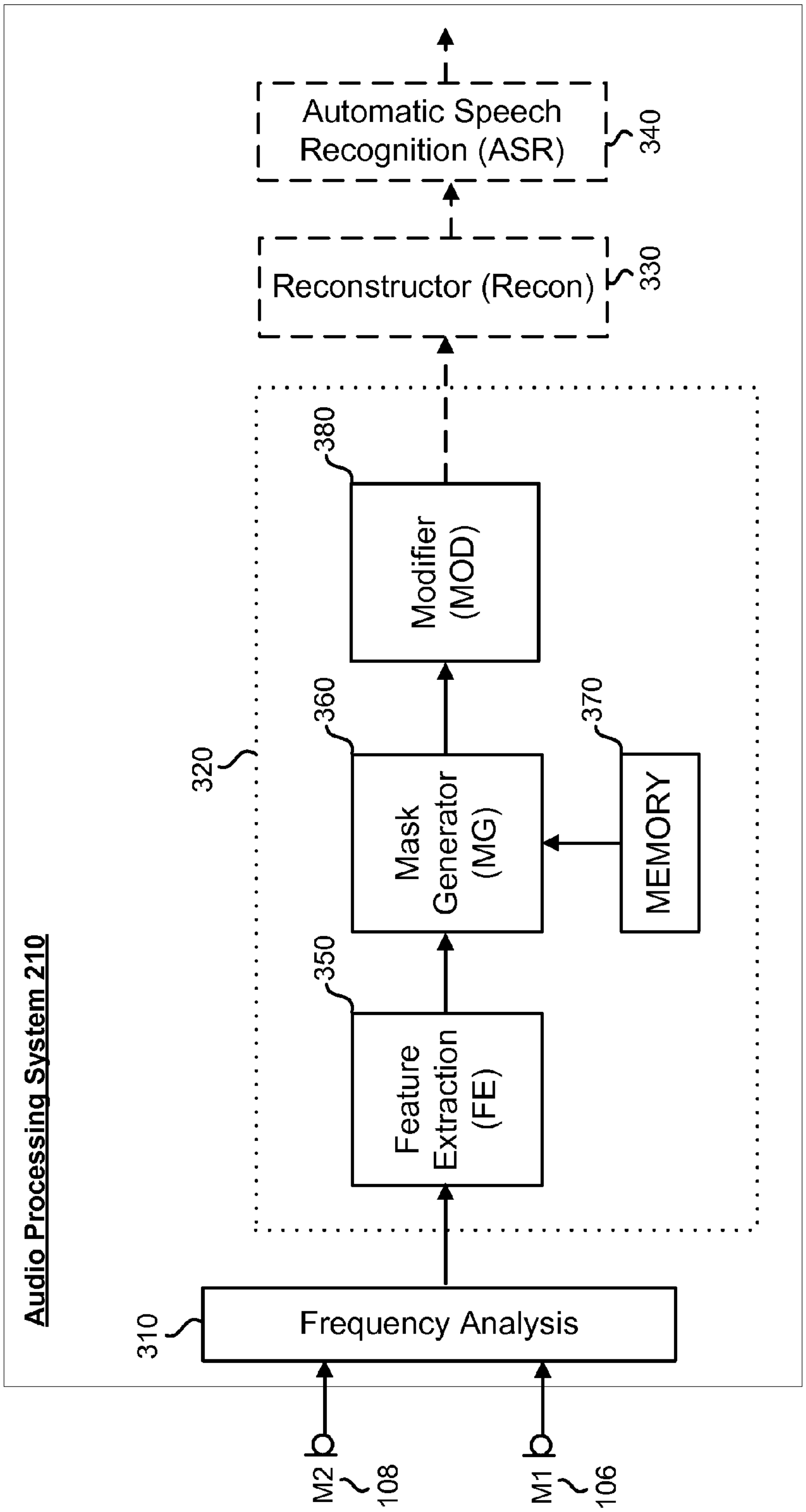
FIG. 3 is a block diagram of an exemplary audio processing system.

FIG. 3 is a block diagram of an exemplary audio processing system 210. The audio processing system 210 of this figure may provide for noise suppression of digital audio signals to be used, for example, in the audio processing system of FIG. 2. The audio processing system 210 may include a frequency analysis module 310, a machine-learning (MN) module 320, optional reconstruction (Recon) module 330, and optional ASR engine 340. The MN module 320 in turn may include a feature extraction (FE) module 350, a mask generator (MG) module 360, a memory 370, and a modifier (MOD) module 380.

In operation, the audio processing system 210 may receive input audio signals including one or more time-domain input signals from the primary microphone 106 and the secondary microphone 108. The input audio signals, when combined by the frequency analysis module 310, may represent noisy speech to be pre-processed before applying to the ASR engine 340. The frequency analysis module 310 may be used to combine the signals from the primary microphone 106 and the secondary microphone 108 and optionally transform them into a frequency-domain for further noise suppression pre-processing.

Further, the noisy speech signal may be fed to the FE module 350, which is used for extraction of one or more cues from the noisy speech. As discussed, these cues may refer to at least one of ILD cues, IPD cues, energy at channel cues, VAD cues, spatial cues, frequency cues, Wiener gain mask estimates, pitch-based cues, periodicity-based cues, noise estimates, context cues, and so forth. The cues may further be fed to the MG module 360 for performing a mapping operation and determining an appropriate gain mask or gain mask estimate based thereon. The MG module 360 may include a mapper (not shown), which employs one or more machine-learning techniques. The mapper may use tables or sets of predetermined reference cues of noise and cues of clean speech stored in the memory to map predefined cues with newly extracted ones in a dynamic, regular manner. As a result of mapping, the mapper may associate the extracted cues with predefined cues of clean speech and/or predefined noise so as to calculate gain factors or a gain map for further input signal processing. In particular, the MOD module 380 applies the gain factors or gain mask to the noise signal to perform noise suppression. The resulting signal with noise suppressed characteristics may be then fed to the Recon module 330 and the ASR engine 340 or directly to the ASR engine 340.

Training System

Figure 4:
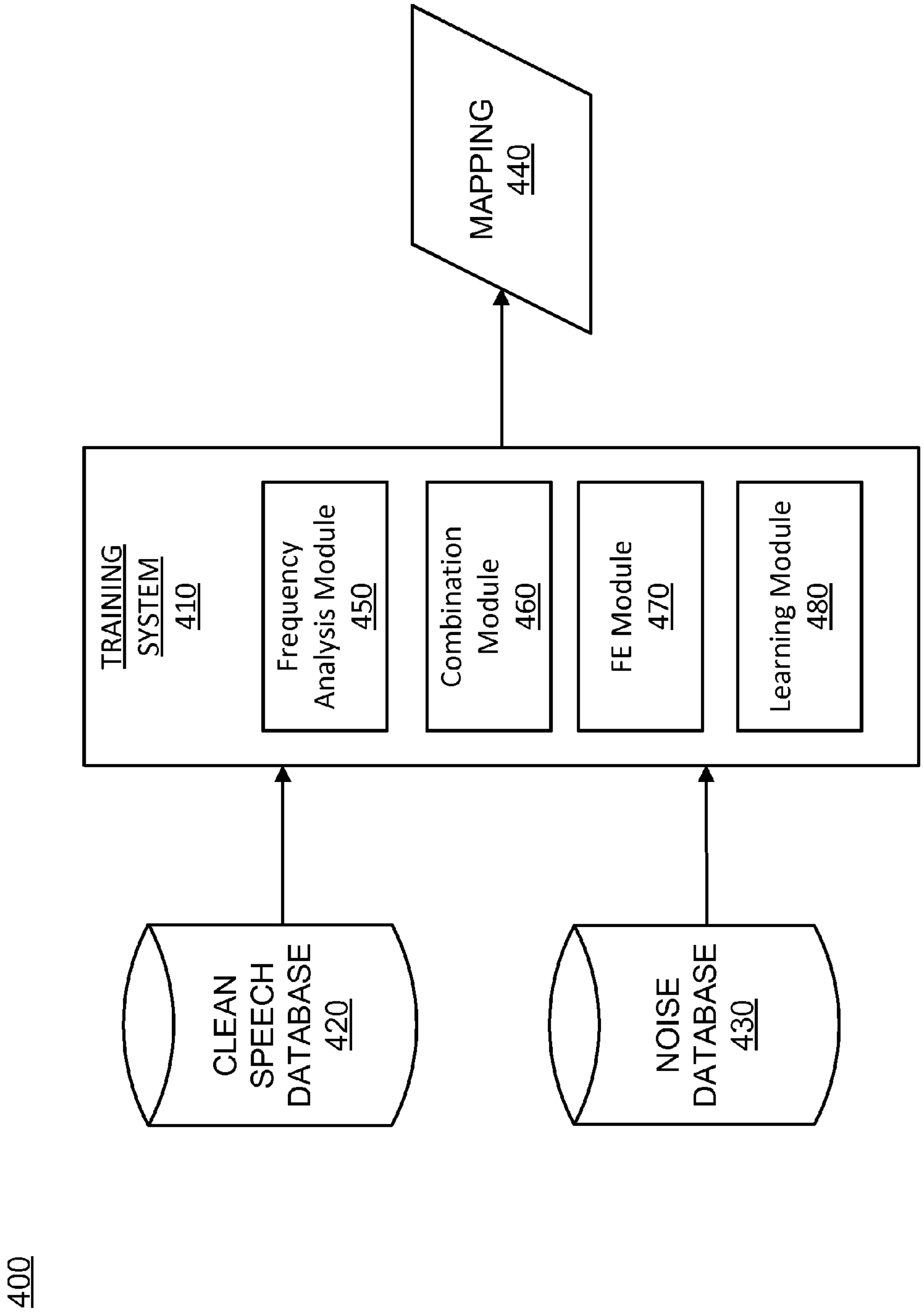
FIG. 4 is a block diagram of an exemplary training system environment.

FIG. 4 is a block diagram of an exemplary training system environment 400. The environment 400 of this figure may provide more detail for the audio processing system of FIG. 2 and may be a part of the audio processing system 210. As shown in the figure, the environment 400 may include a training system 410, a clean speech database 420, a noise database 430, and a mapping module 440.

As follows from this figure, a frequency analysis module 450 and/or combination module 460 of the training system 410 may receive predetermined reference clean speech signals and predetermined reference noise signals from the clean speech database 420 and the noise database 430, respectively. These reference clean speech and noise signals may be combined by a combination module 460 of the training system 410 into "synthetic" noisy speech signals. The synthetic noisy speech signals may then be processed, and one or more cues may be extracted therefrom, by a Frequency Extractor (FE) module 470 of the training system 410. As discussed, these cues may refer to at least one of ILD cues, IPD cues, energy at channel cues, VAD cues, spatial cues, frequency cues, Wiener gain mask estimates, pitch-based cues, periodicity-based cues, noise estimates, context cues, and so forth.

With continuing reference to FIG. 4, a learning module 480 of the training system 410 may apply one or more machine-learning algorithms such as regression trees, a non-linear transform algorithms, linear transform algorithms, statistical or heuristic algorithms, neural networks, or a GMM to determine mapping between the cues and gain coefficients using reference clean speech and noise signals. It should be noted that in some embodiments, the one or more machine-learning algorithms of the training system 410 may be the same machine-learning algorithms as used in the MG module 360. In some other alternative embodiments, the one or more machine-learning algorithms of the training system 410 differ from the one or more machine-learning algorithms used in the MG module 360. In either case, the learning module 480 may employ the one or more machine learning algorithms to determine mapping between the extracted cues and one or more gain coefficients or factors utilizing the reference clean speech signals from the clean speech database 420 and using the reference noise signals from the noise database 430. The result of the determination may then be provided to optional mapping module 440 for further use. In other words, the mapping module 440 may store the correlation between synthetic noise speech and reference clean and reference noise signals for appropriate selection or construction of a gain mask in the system. The mapping may be optionally stored in the memory 370.

Example Operation Principles

Figure 5:
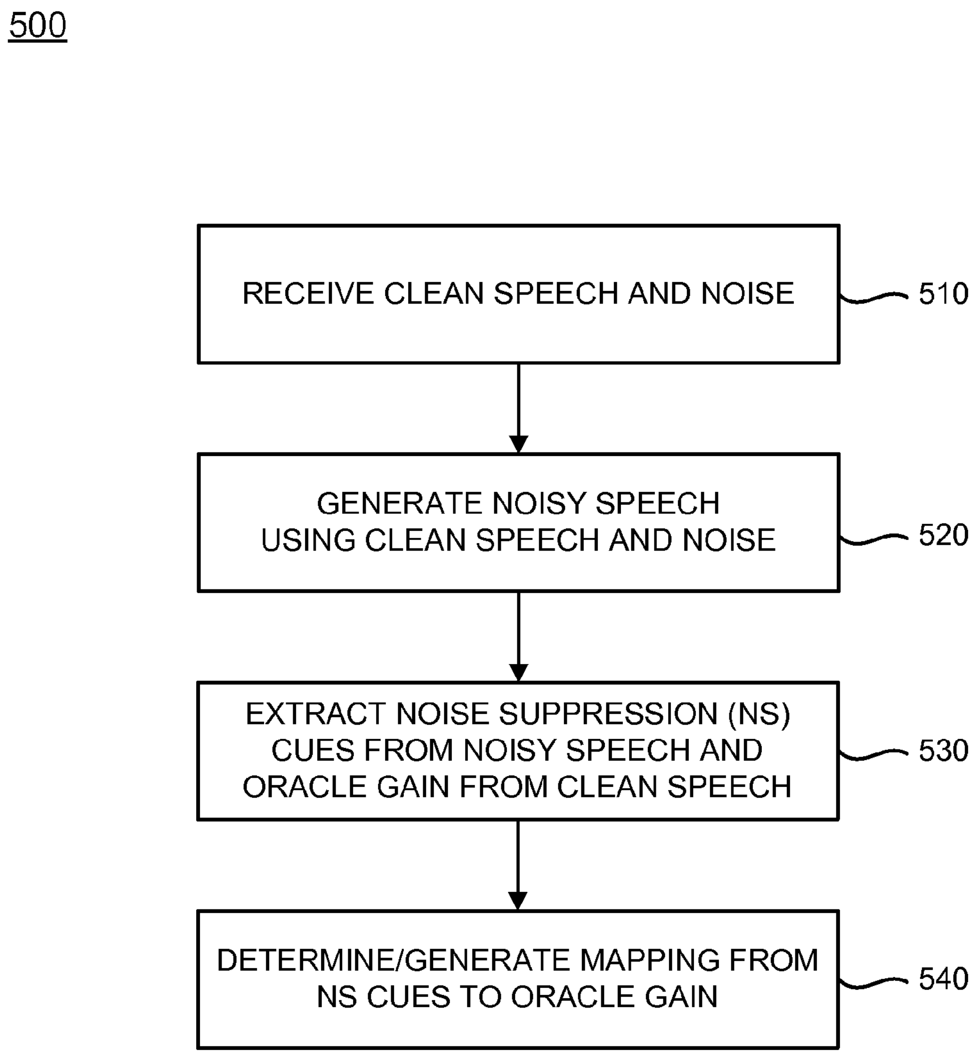
FIG. 5 illustrates a flow chart of an example method for training a machine-learning technique used for noise suppression.

FIG. 5 illustrates a flow chart of example method 500 for training a machine-learning technique used for noise suppression. The method 500 may be practiced, for example, by the training system 410 and its components as described above with references to FIG. 4.

The method 500 may commence in operation 510 with the frequency analysis module 450 receiving reference clean speech and reference noise from the databases 420, 430, accordingly, or from one or more microphones (e.g., the primary microphone 106 and the secondary microphone 108). At operation 520, the combination module 460 may generate noisy speech using the clean speech and the noise as received by the frequency analysis module 450. At operation 530, the FE module 470 extracts NS cues from noisy speech and oracle gain from clean speech. At operation 540, the learning module 480 may determine/generate a mapping from the NS cues to the oracle gain using one or more machine learning techniques.

Figure 6:
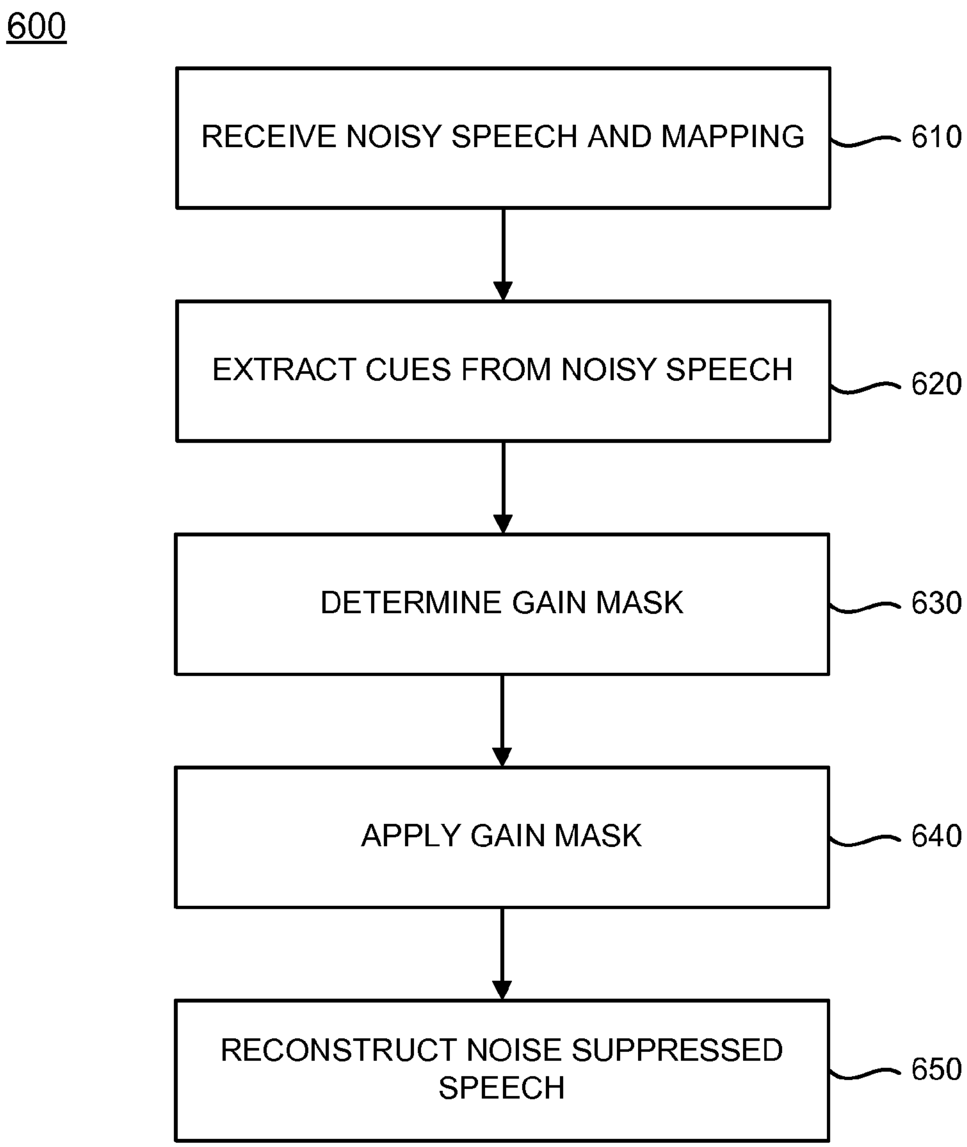
FIG. 6 illustrates a flow chart of an example method for noise suppression.

FIG. 6 illustrates a flow chart of example method 600 for noise suppression. The method 600 may be practiced, for example, by the audio processing system 210 and its components as described above with references to FIG. 3.

The method 600 may commence in operation 610 with the frequency analysis module 310 receiving noisy speech from the primary microphone 106 and the secondary microphone 108 (e.g., the inputs from both microphones may be combined into a single signal and transformed from time-domain to a frequency domain). At this operation, the memory 370 may also provide or receive an appropriate mapping data generated at a training process of at least one machine-learning technique as discussed above, for example, with reference to FIG. 5.

Further, at operation 620, the FE module 350 extracts one or more cues from the noisy speech as received by the frequency analysis module 310. The cues may refer to at least one of ILD cues, IPD cues, energy at channel cues, VAD cues, spatial cues, frequency cues, Wiener gain mask estimates, pitch-based cues, periodicity-based cues, noise estimates, context cues, and so forth. At operation 630, the MG module 360 determines a gain mask from the cues using the mapping and a selected one or more machine-learning algorithms. At operation 640, the MOD module 380 applies the gain mask (e.g., a set of gain coefficients in a frequency domain) to the noisy speech so as to suppress unwanted noise levels. At operation 650, the Recon module 330 may reconstruct the noise suppressed speech signal and optionally transform it from the frequency domain into a time domain.

Figure 7:
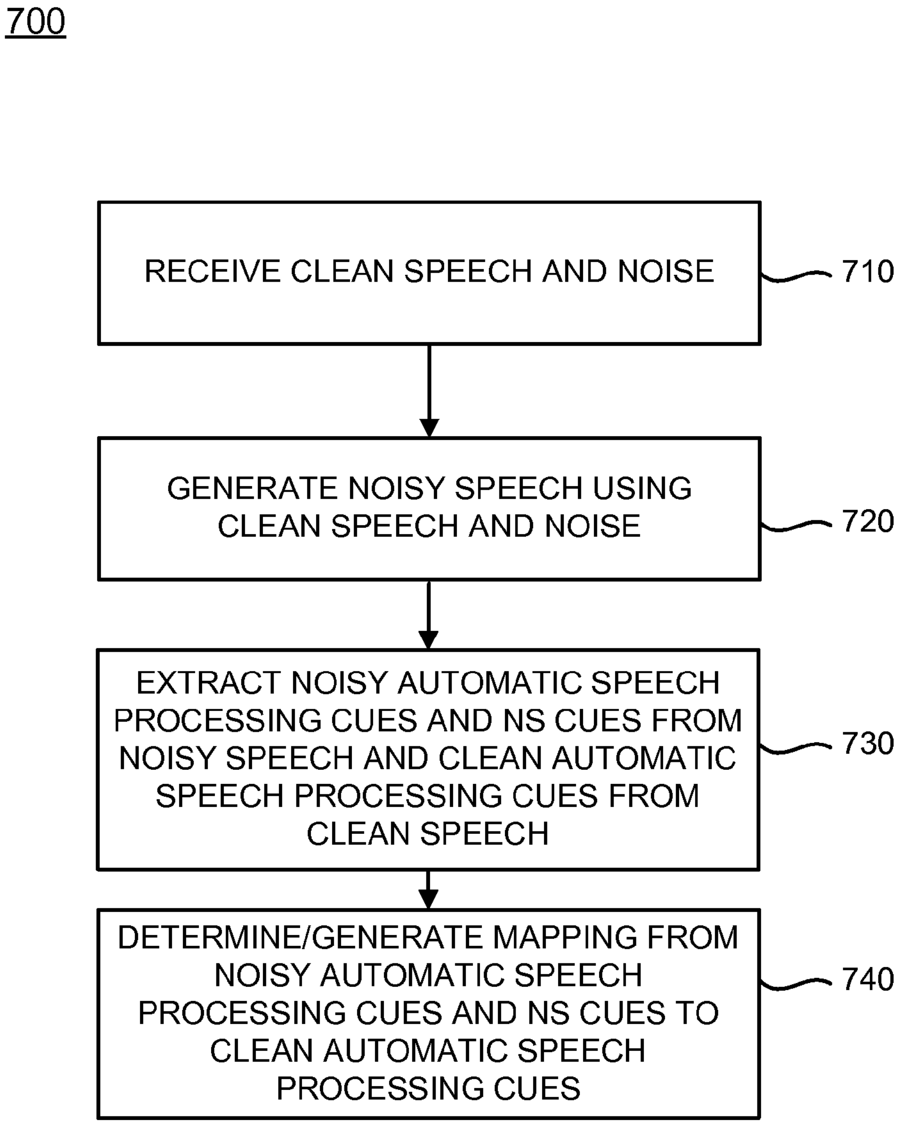
FIG. 7 illustrates a flow chart of yet another example method for training a machine-learning technique used for noise suppression.

FIG. 7 illustrates a flow chart of yet another example method 700 for training a machine-learning technique used for noise suppression. The method 700 may be practiced, for example, by the training system 410 and its components as described above with references to FIG. 4.

The method 700 may commence in operation 710 with the frequency analysis module 450 receiving predetermined reference clean speech from the clean speech database 420 and predetermined reference noise from the noise database 430. At operation 720, the combination module 460 may generate noisy speech using the clean speech and the noise received by the frequency analysis module 450. At operation 730, the FE module 470 may extract noisy automatic speech processing cues and NS cues from the noisy speech and clean ASR cues from clean speech. The automatic speech processing cues may be, but are not limited to, automatic speech recognition, language recognition, keyword recognition, speech confirmation, emotion detection, voice sensing, or speaker recognition cues. At operation 740, the learning module 480 may determine/generate a mapping from noisy automatic speech processing cues and NS cues to clean automatic speech processing cues, the mapping may be optionally stored in the memory 370 of FIG. 3 for future use.

Figure 8:
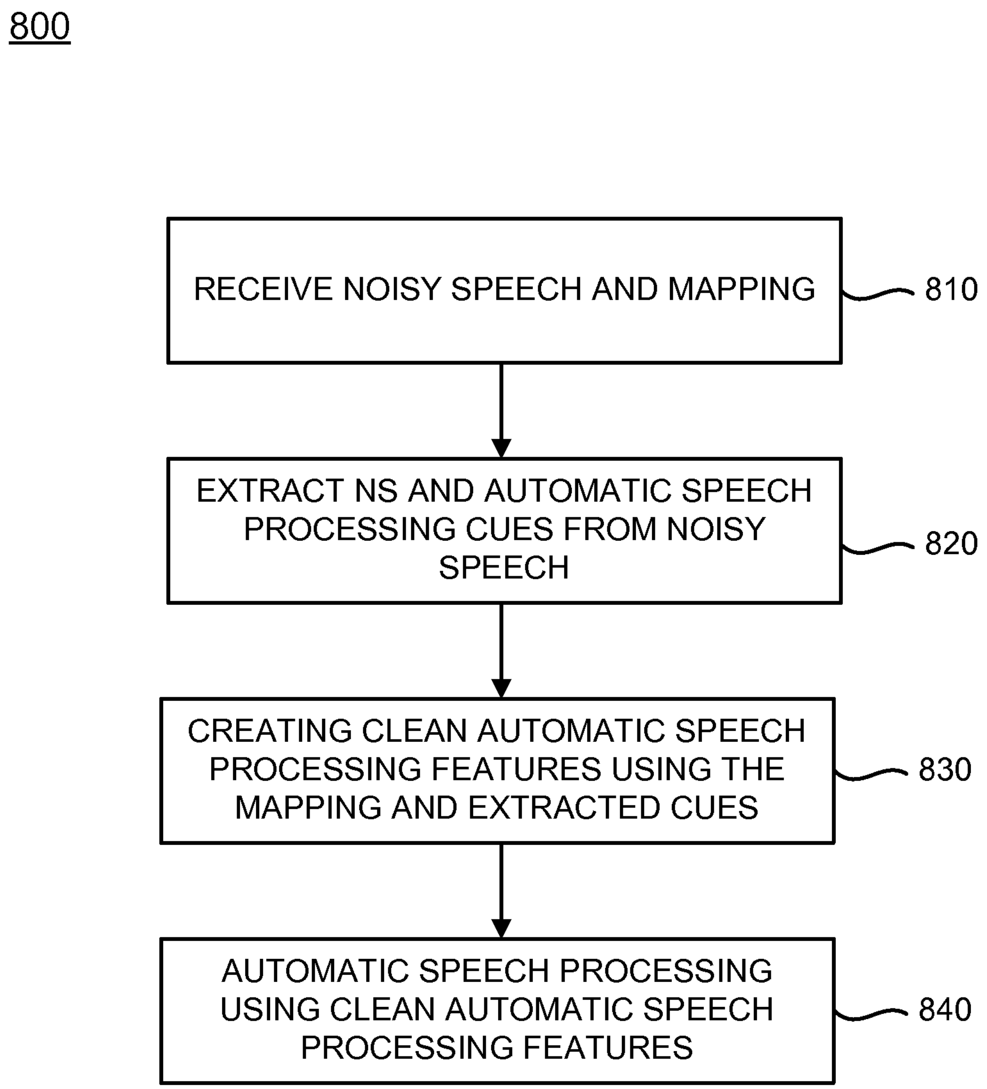
FIG. 8 illustrates a flow chart of yet another example method for noise suppression.

FIG. 8 illustrates a flow chart of yet another example method 800 for noise suppression. The method 800 may be practiced, for example, by the audio processing system 210 and its components as described above with references to FIG. 3.

The method 800 may commence in operation 810 with the frequency analysis module 310 receiving noisy speech from the primary microphone 106 and the secondary microphone 108, and with the memory 370 providing or receiving mapping data generated at a training process of at least one machine-learning technique as discussed above, for example, with reference to FIG. 7.

Further, at operation 820, the FE module 350 extracts NS and automatic speech processing cues from the input noisy speech. At operation 830, the MOD module 380 may apply the mapping to produce clean automatic speech processing features. The automatic speech processing features may be, but are not limited to, automatic speech recognition, language recognition, keyword recognition, speech confirmation, emotion detection, voice sensing, or speaker recognition features. In one example for ASR, at operation 840, the clean automatic speech processing features are fed into the ASR engine 340 for speech recognition. In this method, the ASR engine 340 may generate clean speech signals based on the clean automatic speech processing (e.g., ASR) features without a need to reconstruct the noisy input signal.

In some embodiments, the processing of the noise suppression for speech processing based on machine-learning mask estimation may be cloud-based.

Example Computer System

Figure 9:
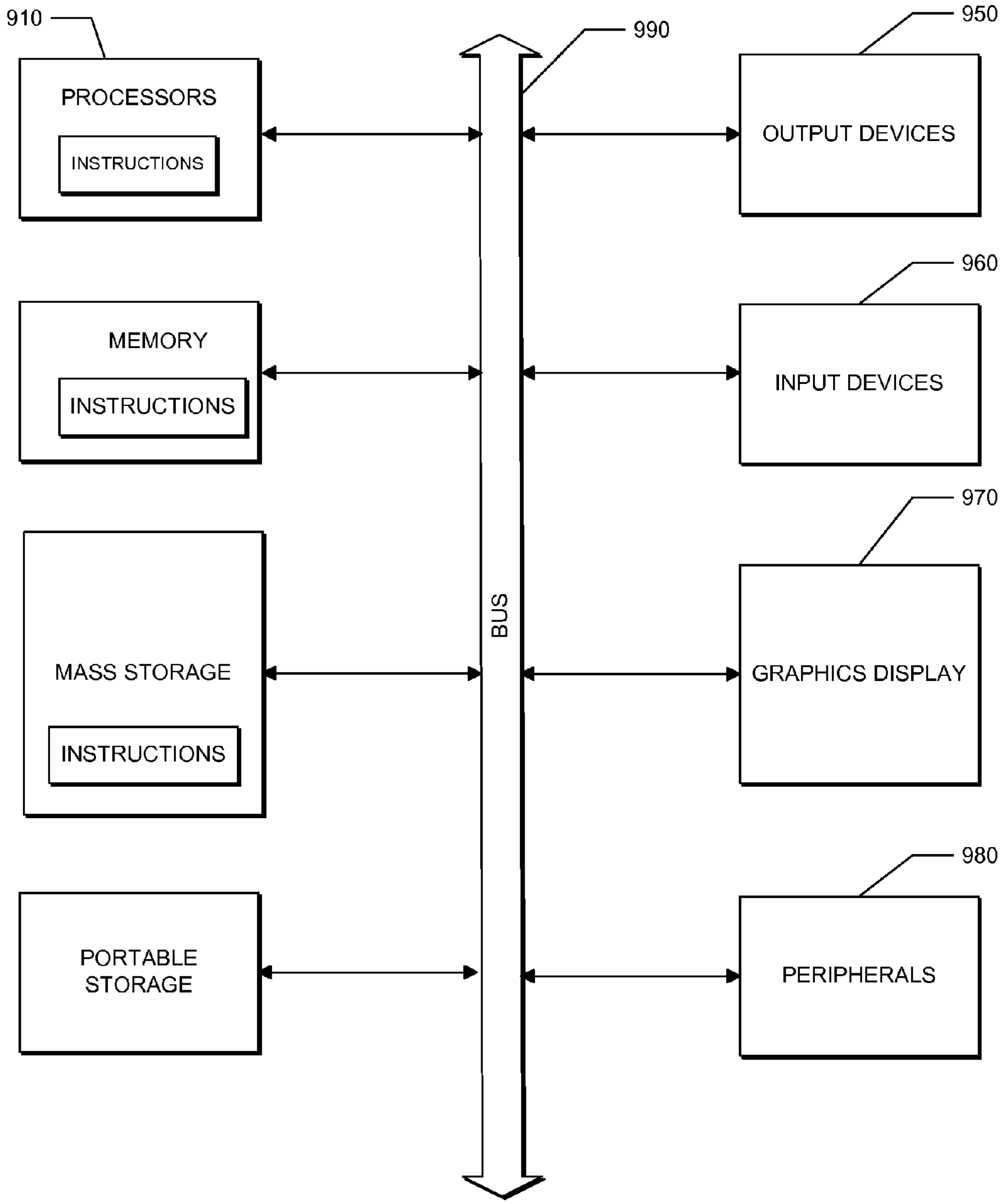
FIG. 9 is a diagrammatic representation of an example machine in the form of a computer system, within which a set of instructions for causing the machine to perform any one or more of the methodologies discussed herein may be executed.

FIG. 9 is a diagrammatic representation of an example machine in the form of a computer system 900, within which a set of instructions for causing the machine to perform any one or more of the methodologies discussed herein may be executed.

In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 910 (e.g., a central processing unit (CPU), a graphics processing unit (GPU), or both), memory 920, static mass storage 930, portable storage device 940, which communicate with each other via a bus 990. The computer system 900 may further include a graphics display unit 970 (e.g., a liquid crystal display (LCD), touchscreen and the like). The computer system 900 may also include input devices 960 (e.g., physical and/or virtual keyboard, keypad, a cursor control device, a mouse, touchpad, touchscreen, and the like), output devices 950 (e.g., speakers), peripherals 980 (e.g., a speaker, one or more microphones, printer, modem, communication device, network adapter, router, radio, modem, and the like). The computer system 900 may further include a data encryption module (not shown) to encrypt data.

The memory 920 and/or mass storage 930 include a computer-readable medium on which is stored one or more sets of instructions and data structures (e.g., instructions) embodying or utilizing any one or more of the methodologies or functions described herein. The instructions may also reside, completely or at least partially, within the main memory 920 and/or within the processors 910 during execution thereof by the computer system 900. The memory 920 and the processors 910 may also constitute machine-readable media. The instructions may further be transmitted or received over a wired and/or wireless network (not shown) via the network interface device (e.g. peripherals 980). While the computer-readable medium discussed herein in an example embodiment is a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

In some embodiments, the computing system 900 may be implemented as a cloud-based computing environment, such as a virtual machine operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing device 200, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method for noise suppression, comprising:
receiving, by a first processor communicatively coupled with a first memory, first noisy speech, the first noisy speech obtained using two or more microphones;
extracting, by the first processor, one or more first cues from the first noisy speech, the one or more first cues including cues associated with noise suppression and automatic speech processing; and
creating clean automatic speech processing features using a mapping and the extracted one or more first cues, the clean automatic speech processing features being for use in automatic speech processing and the mapping being provided by a process including:
receiving, by a second processor communicatively coupled with a second memory, clean speech and noise;
producing, by the second processor, second noisy speech using the clean speech and the noise;
extracting, by the second processor, one or more second cues from the second noisy speech, the one or more second cues including cues associated with noise suppression and noisy automatic speech processing;
extracting clean automatic speech processing cues from the clean speech; and
generating, by the second processor, the mapping from the one or more second cues to the clean automatic speech processing cues, the generating including at least one machine-learning technique.

2. The method of claim 1, wherein the automatic speech processing comprises automatic speech recognition.

3. The method of claim 1, wherein the automatic speech processing comprises one or more of automatic speech recognition, language recognition, keyword recognition, speech confirmation, emotion detection, voice sensing, and speaker recognition.

4. The method of claim 1, wherein receiving, by the second processor, the clean speech and the noise comprises receiving predetermined reference clean speech and predetermined reference noise from a reference database.

5. The method of claim 1, wherein the clean speech and noise are each obtained using at least two microphones, the one or more first and second cues each including at least one inter-microphone level difference (ILD) cues and inter-microphone phase difference (IPD) cues.

6. The method of claim 4, wherein the automatic speech processing comprises one or more of automatic speech recognition, language recognition, keyword recognition, speech confirmation, emotion detection, voice sensing, and speaker recognition.

7. The method of claim 1, wherein the one or more first cues and the one or more second cues each further include at least one of energy at channel cues, voice activity detection (VAD) cues, spatial cues, frequency cues, Wiener gain mask estimates, pitch-based cues, periodicity-based cues, noise estimates, and context cues.

8. The method of claim 1, wherein the at least one machine-learning technique includes one or more of a neural network, regression tree, a nonlinear transform, a linear transform, and a Gaussian Mixture Model (GMM).

9. The method of claim 1, wherein the generating applies the at least one machine-learning technique to the clean speech and the second noisy speech.

10. A system for noise suppression, comprising:
a first frequency analysis module, executed by at least one processor, that is configured to receive first noisy speech, the first noisy speech being each obtained using at least two microphones;
a second frequency analysis module, executed by the at least one processor, that is configured to receive clean speech and noise;
a combination module, executed by the at least one processor, that is configured to produce second noisy speech using the clean speech and the noise;
a first cue extraction module, executed by the at least one processor, that is configured to extract one or more first cues from the first noisy speech, the one or more first cues including cues associated with noise suppression and automatic speech processing;

a second cue extraction module, executed by the at least one processor, that is configured to extract one or more second cues from the second noisy speech, the one or more second cues including cues associated with noise suppression and noisy automatic speech processing;

a third cue extraction module, executed by the at least one processor, that is configured to extract clean automatic speech processing cues from the clean speech; and a learning module, executed by the at least one processor, that is configured to generate a mapping from the one or more second cues associated with the noise suppression cues and the noisy automatic speech processing cues to the clean automatic speech processing cues, the generating including at least one machine-learning technique; and a modification module, executed by the at least one processor, that is configured to create clean automatic speech processing features using the mapping and the extracted one or more first cues, the clean automatic speech processing features being for use in automatic speech processing.

11. The system of claim 10, wherein the automatic speech processing comprises automatic speech recognition.

12. The system of claim 10, wherein the automatic speech processing comprises one or more of automatic speech recognition, language recognition, keyword recognition, speech confirmation, emotion detection, voice sensing, and speaker recognition.

13. The system of claim 10, wherein the second frequency analysis module is configured to receive the clean speech and the noise from a reference database, the clean speech and noise being predetermined reference clean speech and predetermined reference noise.

14. The system of claim 10, wherein the at least one machine-learning technique includes one or more of a neural network, regression tree, a non-linear transform, a linear transform, and a Gaussian Mixture Model (GMM).

15. The system of claim 10, wherein the one or more first cues and the one or more second cues each include at least one of ILD cues and IPD cues.

16. The system of claim 10, wherein the one or more first cues and the one or more second cues each include at least one of energy at channel cues, VAD cues, spatial cues, frequency cues, Wiener gain mask estimates, pitch-based cues, periodicity-based cues, noise estimates, and context cues.

17. The system of claim 14, wherein the at least one machine-learning techniques each include one or more of a neural network, regression tree, a non-linear transform, a linear transform, and a GMM.

18. The method of claim 1, wherein the first processor communicatively coupled with the first memory are included in a cloud-based computing environment.

* * * * *